United States Patent
Monroe et al.

(10) Patent No.: US 10,684,811 B2
(45) Date of Patent: Jun. 16, 2020

(54) VEHICLE COMMUNICATION BETWEEN PERIPHERAL ELECTRONIC DEVICES, LIGHTING SYSTEMS, AND METHODS

(71) Applicants: Jason Monroe, Auburn Hills, MI (US); Christopher S. Welch, Ferndale, MI (US); Lei Zhang, Auburn Hills, MI (US)

(72) Inventors: Jason Monroe, Auburn Hills, MI (US); Christopher S. Welch, Ferndale, MI (US); Lei Zhang, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 57 days.

(21) Appl. No.: 15/856,375

(22) Filed: Dec. 28, 2017

(65) Prior Publication Data

US 2018/0181359 A1 Jun. 28, 2018

Related U.S. Application Data

(60) Provisional application No. 62/439,597, filed on Dec. 28, 2016.

(51) Int. Cl.
*G06F 3/14* (2006.01)
*B60Q 3/12* (2017.01)
(Continued)

(52) U.S. Cl.
CPC ............ *G06F 3/1423* (2013.01); *B60K 37/04* (2013.01); *B60Q 1/323* (2013.01); *B60Q 1/50* (2013.01);
(Continued)

(58) Field of Classification Search
CPC .... G06F 3/1423; G06F 3/0488; G06F 3/0482; G06F 3/0484; B60Q 1/50; B60Q 3/12; B60Q 3/10; B60Q 3/233; B60Q 3/80; B60Q 3/74; B60Q 3/51; B60Q 1/323; B60Q 2400/40; B60Q 2400/50; B60R 11/04; B60R 11/00; B60R 16/02; B60R 2011/008; B60R 2011/0005; B60R 2011/0015; B60R 2011/0021; B60R 2011/0028; B60R 2011/0075; B60K 37/04; B60K 2350/90; B60K 2350/941; B60K 2350/948; B60K 2350/945; B60K 2350/40; B60K 2350/307; B60K 2350/1008; B60K 2350/106; B60K 35/00; B60K 2370/81; B60K 2370/573; B60K 2370/834; B60K 2370/744;
(Continued)

(56) References Cited

U.S. PATENT DOCUMENTS 6,768,420 B2 7/2004 McCarthy et al.
8,818,725 B2 8/2014 Ricci
(Continued)

FOREIGN PATENT DOCUMENTS

CA 2359826 A1 5/2002

*Primary Examiner* — Darlene M Ritchie
(74) *Attorney, Agent, or Firm* — Ralph E Smith

(57) ABSTRACT

A vehicle includes at least one display and a central controller in signal communication with the at least one display. The central controller is configured to detect a plurality of unique user profiles associated with peripheral electronic user devices located within the vehicle, and to establish signal communication with the peripheral electronic user devices located within the vehicle.

26 Claims, 20 Drawing Sheets

(51) Int. Cl.
- *B60Q 1/50* (2006.01)
- *B60Q 3/10* (2017.01)
- *B60K 37/04* (2006.01)
- *B60R 11/00* (2006.01)
- *B60R 11/04* (2006.01)
- *B60R 16/02* (2006.01)
- *B60Q 3/80* (2017.01)
- *B60Q 3/74* (2017.01)
- *B60Q 3/51* (2017.01)
- *B60Q 1/32* (2006.01)
- *B60Q 3/233* (2017.01)
- *G06F 3/0488* (2013.01)
- *G06F 3/0482* (2013.01)
- *G06F 3/0484* (2013.01)
- *B60K 35/00* (2006.01)

(52) U.S. Cl.
CPC ............... *B60Q 3/10* (2017.02); *B60Q 3/12* (2017.02); *B60Q 3/233* (2017.02); *B60Q 3/51* (2017.02); *B60Q 3/74* (2017.02); *B60Q 3/80* (2017.02); *B60R 11/00* (2013.01); *B60R 11/04* (2013.01); *B60R 16/02* (2013.01); *G06F 3/0482* (2013.01); *G06F 3/0484* (2013.01); *G06F 3/0488* (2013.01); *B60K 35/00* (2013.01); *B60K 2370/12* (2019.05); *B60K 2370/152* (2019.05); *B60K 2370/46* (2019.05); *B60K 2370/56* (2019.05); *B60K 2370/573* (2019.05); *B60K 2370/586* (2019.05); *B60K 2370/60* (2019.05); *B60K 2370/73* (2019.05); *B60K 2370/744* (2019.05); *B60K 2370/81* (2019.05); *B60K 2370/828* (2019.05); *B60K 2370/834* (2019.05); *B60Q 2400/40* (2013.01); *B60Q 2400/50* (2013.01); *B60R 2011/0005* (2013.01); *B60R 2011/008* (2013.01); *B60R 2011/0015* (2013.01); *B60R 2011/0021* (2013.01); *B60R 2011/0028* (2013.01); *B60R 2011/0075* (2013.01)

(58) Field of Classification Search
CPC ............ B60K 2370/73; B60K 2370/56; B60K 2370/586; B60K 2370/12; B60K 2370/46; B60K 2370/60; B60K 2370/152; B60K 2370/828

See application file for complete search history.

(56) References Cited

U.S. PATENT DOCUMENTS

| | | |
|---|---|---|
| 9,008,906 B2 | 4/2015 | Ricci |
| 9,177,429 B2 | 11/2015 | Lawrenson |
| 9,758,090 B1* | 9/2017 | Salter ................ B60Q 1/323 |
| 9,809,161 B1* | 11/2017 | Salter ................ G02B 27/425 |
| 2006/0184800 A1 | 8/2006 | Rosenberg |
| 2012/0053793 A1 | 3/2012 | Sala et al. |
| 2013/0145401 A1 | 6/2013 | Ricci |
| 2013/0218412 A1* | 8/2013 | Ricci ................ G06F 17/00 701/36 |
| 2014/0068010 A1* | 3/2014 | Nicholson .......... B60K 35/00 709/219 |
| 2014/0115488 A1* | 4/2014 | Hackborn .......... H04M 1/72544 715/741 |
| 2014/0207338 A1* | 7/2014 | Healey ................ G06F 7/00 701/45 |
| 2014/0309877 A1* | 10/2014 | Ricci ................ H04W 4/21 701/36 |
| 2014/0309891 A1* | 10/2014 | Ricci ................ B60Q 9/00 701/48 |
| 2014/0313343 A1 | 10/2014 | Frank et al. |
| 2015/0019266 A1 | 1/2015 | Stempora |
| 2015/0032328 A1 | 1/2015 | Healey et al. |
| 2015/0120135 A1 | 4/2015 | Lawrenson |
| 2015/0138002 A1* | 5/2015 | Beggs ................ B60Q 1/2673 340/944 |
| 2015/0193030 A1* | 7/2015 | Grover ................ B60K 37/06 701/36 |
| 2016/0100084 A1 | 4/2016 | Schofield et al. |
| 2016/0129851 A1 | 5/2016 | Werner |
| 2016/0207400 A1* | 7/2016 | Xia ................ B60K 35/00 |
| 2017/0103327 A1* | 4/2017 | Penilla ................ B60L 58/12 |
| 2017/0149711 A1* | 5/2017 | Shaw ................ H04L 51/12 |
| 2017/0210282 A1* | 7/2017 | Rodriguez Barros . G03B 21/00 |
| 2018/0088777 A1* | 3/2018 | Daze ................ G06F 3/04817 |
| 2018/0134211 A1* | 5/2018 | Aust ................ B60Q 1/0023 |
| 2018/0222383 A1* | 8/2018 | Mueller ................ B60Q 3/80 |
| 2018/0257553 A1* | 9/2018 | Salter ................ B60Q 3/20 |
| 2018/0264999 A1* | 9/2018 | Salter ................ B60Q 3/217 |

* cited by examiner

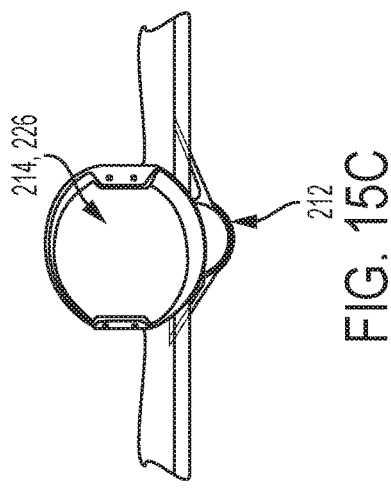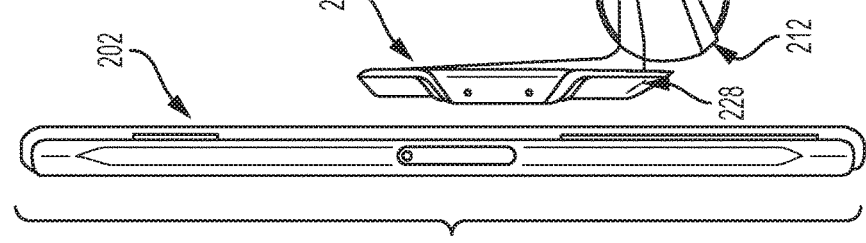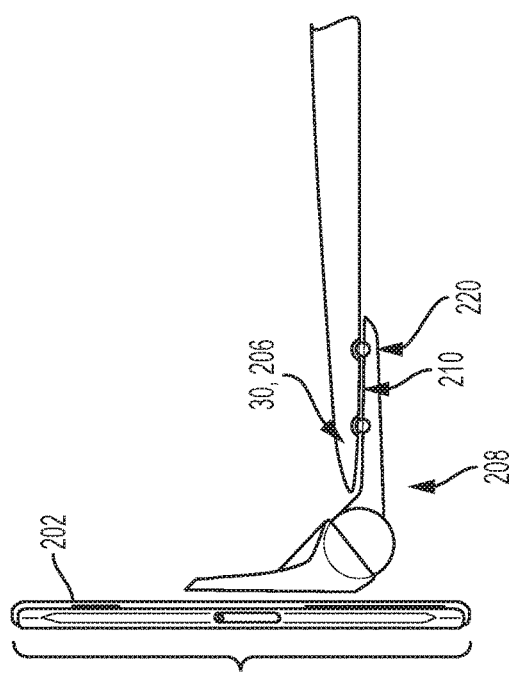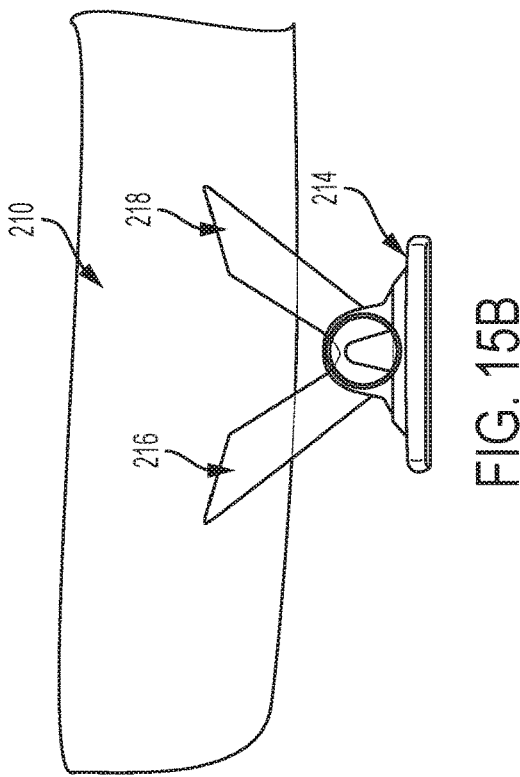

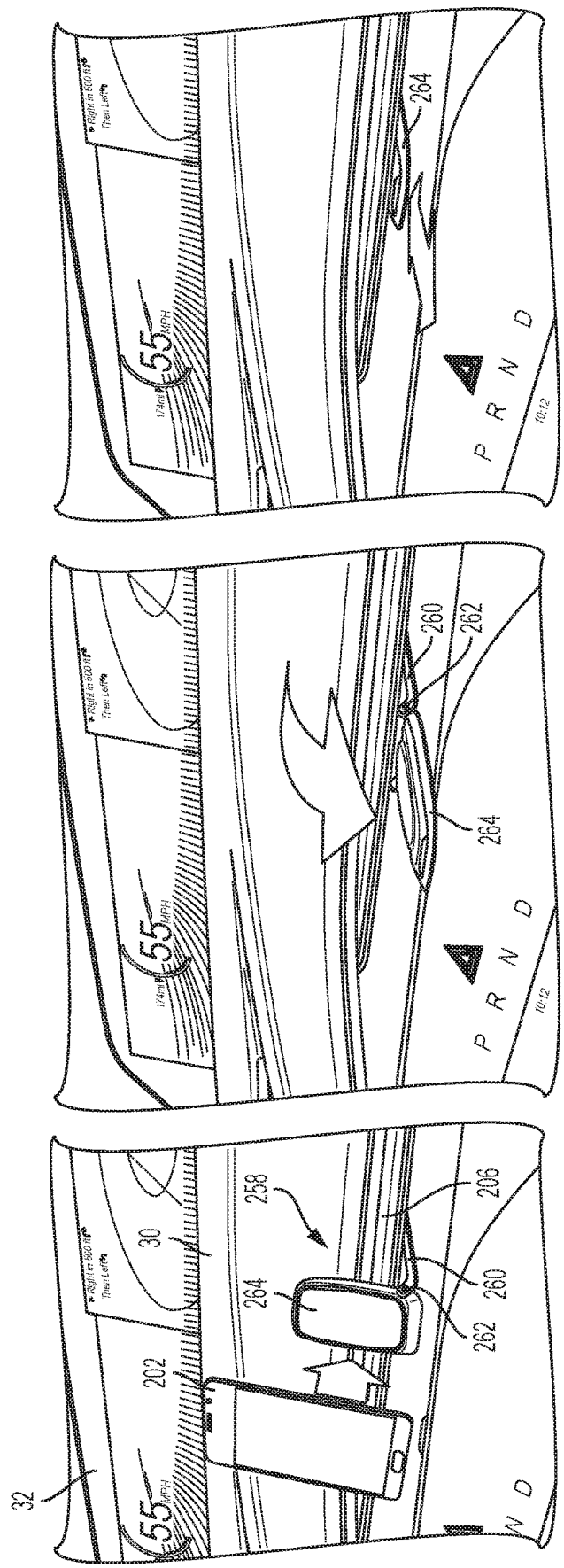

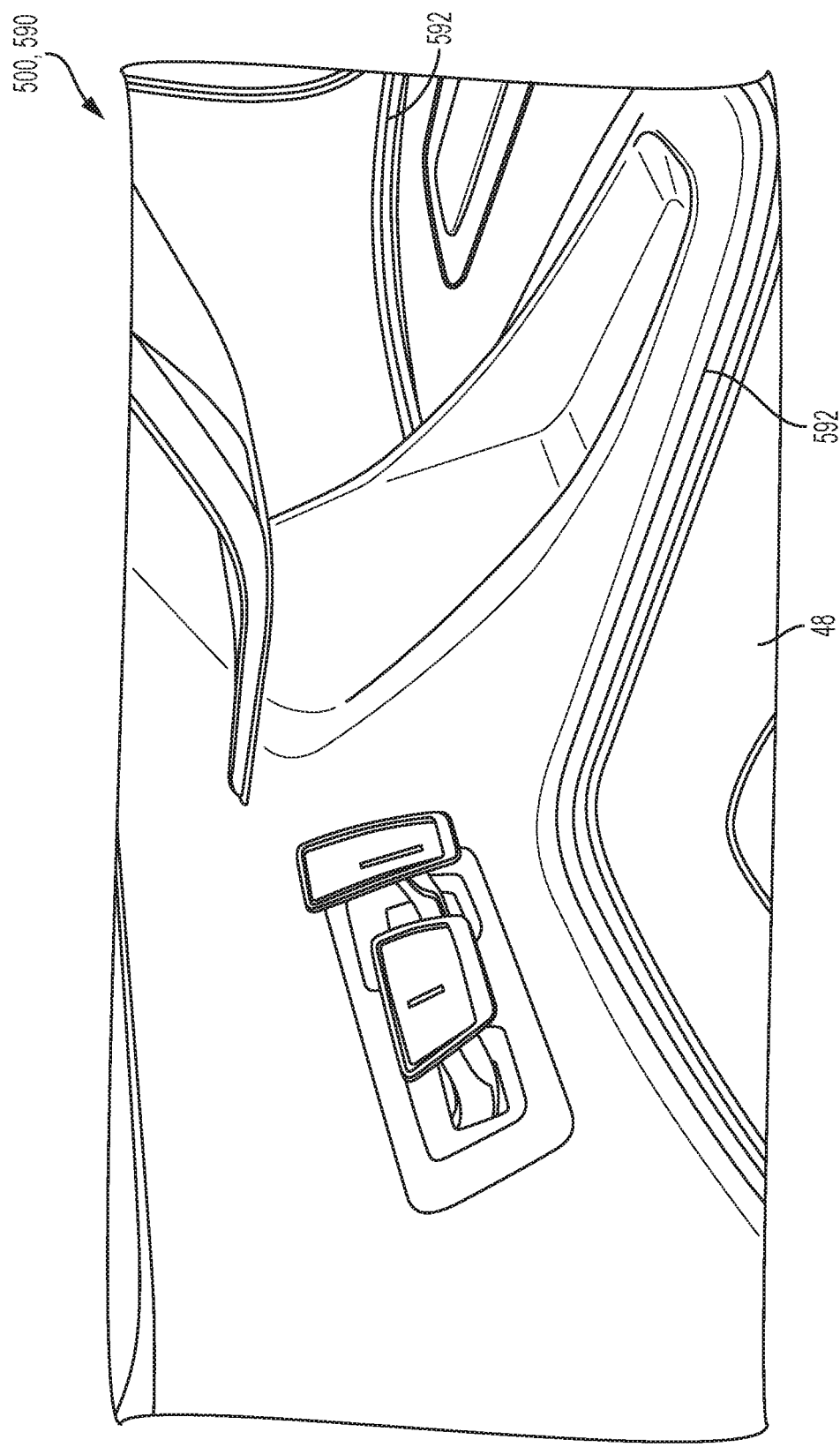

VEHICLE COMMUNICATION BETWEEN PERIPHERAL ELECTRONIC DEVICES, LIGHTING SYSTEMS, AND METHODS

CROSS-REFERENCE TO RELATED APPLICATION

This application claims the benefit of U.S. Provisional Application No. 62/439,597, filed Dec. 28, 2016, the contents of which are incorporated herein by reference thereto.

FIELD

The present application relates generally to passenger vehicles and, more particularly, to lighting systems, modular docking systems, display and user interface systems, and device connectivity systems for passenger vehicles.

BACKGROUND

Current passenger vehicles typically include basic and generic lighting systems without any customizability, as well as basic user interfaces that provide limited interaction between a driver/passenger and the vehicle. Moreover, it may be difficult to operably connect a personal electronic device to current passenger vehicles, and even then, interaction between the vehicle and the personal electronic device is typically limited to hands-free calling/texting or audio playback. Further, current passenger vehicles do not offer user interfaces that provide seamless connectivity and interaction among multiple personal and in-vehicle electronic devices within that vehicle. Accordingly, while such systems work well for their intended purpose, it is desirable to provide a passenger vehicle with improvements to such systems.

SUMMARY

According to one example aspect of the invention, a vehicle is provided. The vehicle includes at least one display and a central controller in signal communication with the at least one display. The central controller is configured to detect a plurality of unique user profiles associated with peripheral electronic user devices located within the vehicle, and to establish signal communication with the peripheral electronic user devices located within the vehicle.

In addition to the foregoing, the described vehicle may include one or more of the following features: wherein the central controller is configured to load each unique user profile and provide a visual display of each user profile on the at least one display; wherein the central controller includes a community platform that connects the peripheral electronic user devices for interaction (i) between the peripheral electronic user devices and (ii) between the peripheral electronic user devices and the at least one display; wherein said interaction includes sharing music; wherein said interaction includes sharing video; wherein said interaction includes sharing media; wherein said interaction includes sharing destinations; and wherein said interaction includes sharing points of interest.

In addition to the foregoing, the described vehicle may include one or more of the following features: wherein the community platform is configured to display on the peripheral electronic user devices media that can be shared on the community platform and provide a share soft button on the peripheral electronic user devices to share the media with one or more other peripheral electronic user devices; wherein the community platform is further configured to provide a selection menu soft button on the peripheral electronic user devices after a user selects the share soft button, the selection menu providing a list of (i) the at least one display and (ii) one or more other peripheral electronic user devices that the media can be shared with; wherein the central controller is configured to define a community profile based on the detected unique user profiles; and wherein the central controller is configured to provide contextual suggestions for the community profile based on determined common interests and/or preferences of the unique user profiles.

In addition to the foregoing, the described vehicle may include one or more of the following features: wherein the central controller is configured to display a different image identifying each detected unique user profile; wherein the different image includes a unique color for each unique user profile; wherein the central controller is configured to visually identify input corresponding to each unique user profile such that the at least one display visually displays input corresponding to each unique user profile in a different manner; wherein the central controller is configured to visually identify the input corresponding to each unique user profile using a different color; and wherein the contextual suggestions include music, destinations, and food choices.

In addition to the foregoing, the described vehicle may include one or more of the following features: wherein the vehicle further comprises at least one customizable lighting system in signal communication with the central controller, wherein the central controller is configured to adjust one or more lighting characteristics of the at least one customizable lighting system; wherein the central controller is configured to adjust the one or more lighting characteristics based on a preference associated with one of the unique user profiles; wherein the one or more lighting characteristics includes light color; wherein the at least one customizable lighting system is an exterior vehicle lighting; wherein the exterior vehicle lighting includes lighting located on a front of the vehicle; wherein the exterior vehicle lighting includes lighting located on a rear of the vehicle; wherein the exterior vehicle lighting includes ring lighting disposed about doors of the vehicle; wherein the exterior vehicle lighting includes a projector configured to project a light onto areas surrounding the vehicle; and wherein the projected light comprises a greeting message, an exit message, or a warning message.

In addition to the foregoing, the described vehicle may include one or more of the following features: wherein the at least one customizable lighting system is an interior vehicle lighting; wherein the interior vehicle lighting includes a dome light coupled to a roof of the vehicle; wherein the interior vehicle lighting includes a seat lighting system with a seat light disposed on one or more seats of the vehicle, each seat light configured to selectively provide a color aura around the associated seat; wherein the interior vehicle lighting includes a headliner lighting system circumscribing at least a portion of an outer perimeter of a headliner of the vehicle; wherein the interior vehicle lighting includes a floor lighting system circumscribing at least a portion of an outer perimeter of a floor of the vehicle; wherein the interior vehicle lighting includes a foot well lighting system configured to provide lighting customized to one of the unique user profiles associated with a seat adjacent the foot well area; and wherein the central controller is configured to control the foot well lighting system to provide lighting differently customized for multiple unique user profiles corresponding to users in multiple different seats.

According to another example aspect of the invention, a vehicle is provided. The vehicle includes at least one display, a central controller, and a customizable lighting system. The central controller is in signal communication with the at least one display and configured to detect a plurality of unique user profiles associated with peripheral electronic user devices located within the vehicle. The central controller is configured to establish signal communication with the peripheral electronic user devices located within the vehicle, load each unique user profile, and provide a visual display of each user profile on the at least one display. The central controller includes a community platform that connects the peripheral electronic user devices for interaction (i) between the peripheral electronic user devices and (ii) between the electronic user devices and the at least one display. The interaction includes sharing at least one of media, destinations, and points of interest.

The community platform is configured to display on the peripheral electronic user devices at least one of the media, destinations, and points of interest that can be shared on the community platform, provide a share soft button on the peripheral electronic user devices to share at least one of the media, destinations, and points of interest with one or more other peripheral electronic user devices, and provide a selection menu soft button on the peripheral electronic user devices after a user selects the share soft button. The selection menu provides a list of (i) the at least one display and (ii) one or more other peripheral electronic user devices that the at least one of media, destinations, and points of interest can be shared with.

The central controller is configured to define a community profile based on the detected unique user profiles, and provide contextual suggestions for the community profile based on determined common interests and/or preferences of the unique user profiles.

The customizable lighting system is in signal communication with the central controller, which is configured to adjust one or more lighting characteristics of the at least one customizable lighting system based on a preference associated with one of the unique user profiles.

The customizable lighting system includes lighting located on the front of the vehicle, a rear of the vehicle, ring lighting disposed about doors of the vehicle, a projector configured to project a light onto areas surrounding the vehicle, a dome light coupled to the roof of the vehicle, a seat lighting system with a seat light disposed on one or more seats of the vehicle, a headliner lighting system circumscribing at least a portion of an outer perimeter of a headliner of the vehicle, and a floor lighting system circumscribing at least a portion of an outer perimeter of a floor of the vehicle.

The central controller is configured to control the customizable lighting system to provide lighting differently customized for multiple unique user profiles corresponding to users in multiple different seats.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 15A is a side view of an example charging assembly of the charge rail system shown in FIG. 14, in accordance with the principles of the present disclosure;

FIG. 15B is a top view of the charging assembly shown in FIG. 15A, in accordance with the principles of the present disclosure;

FIG. 15C is a perspective view of the charging assembly shown in FIG. 15A, in accordance with the principles of the present disclosure;

FIG. 15D is a side view of another example charging assembly, in accordance with the principles of the present disclosure;

FIG. 16A is a perspective view of another example charging assembly in a deployed first position, in accordance with the principles of the present disclosure;

FIG. 16B is a perspective view of the example charging assembly shown in FIG. 16A in an intermediate second position, in accordance with the principles of the present disclosure;

FIG. 16C is a perspective view of the example charging assembly shown in FIG. 16A in a stowed third position, in accordance with the principles of the present disclosure;

FIG. 23 is a perspective view of an example lighting system for the vehicles shown in FIGS. 1 and 2, in accordance with the principles of the present disclosure.

DETAILED DESCRIPTION

Figure 1:
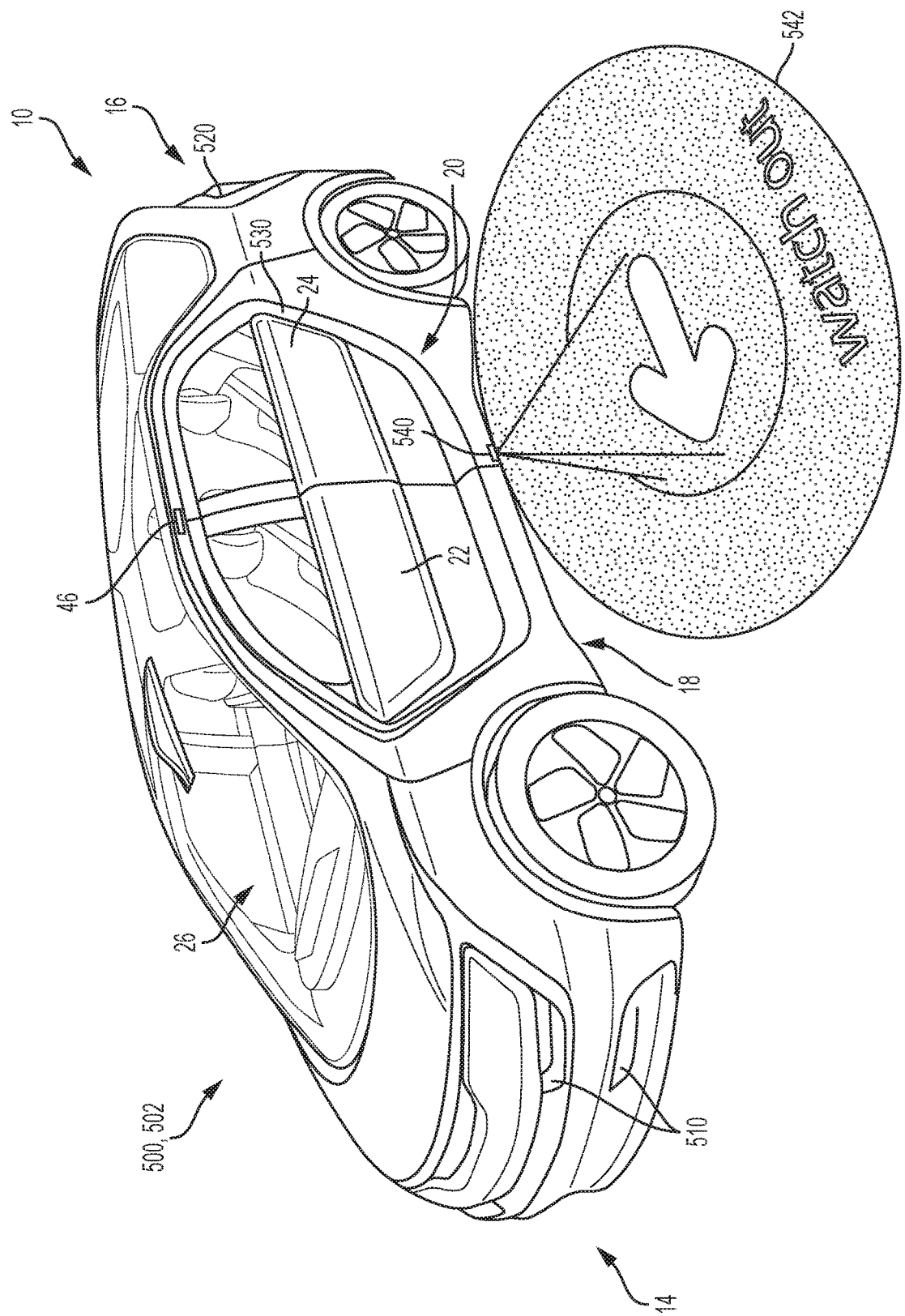
FIG. 1 is a perspective view of an example vehicle in accordance with the principles of the present disclosure.
Figure 2:
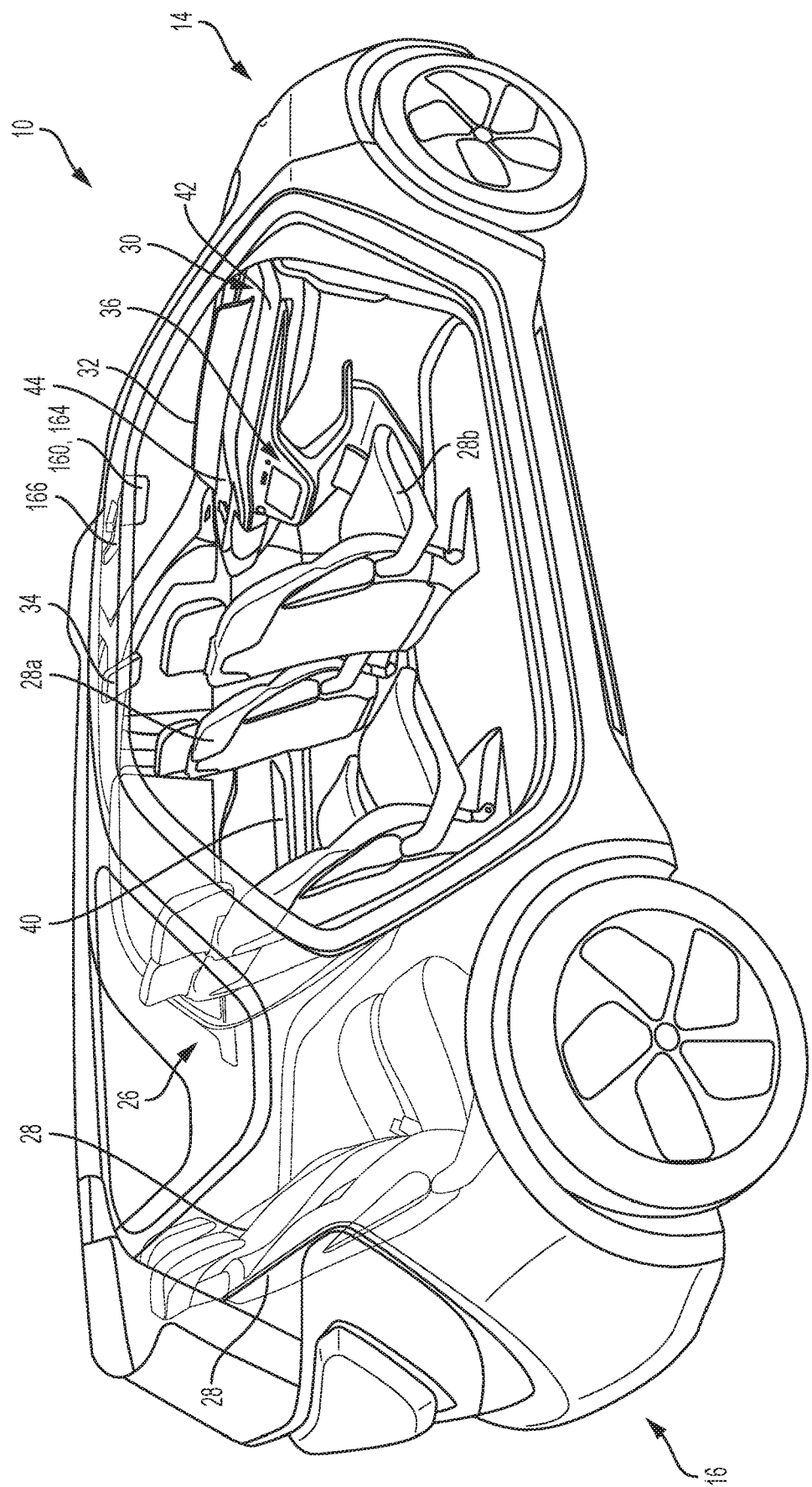
FIG. 2 is a perspective cutaway view of another example vehicle in accordance with the principles of the present disclosure.
Figure 3:
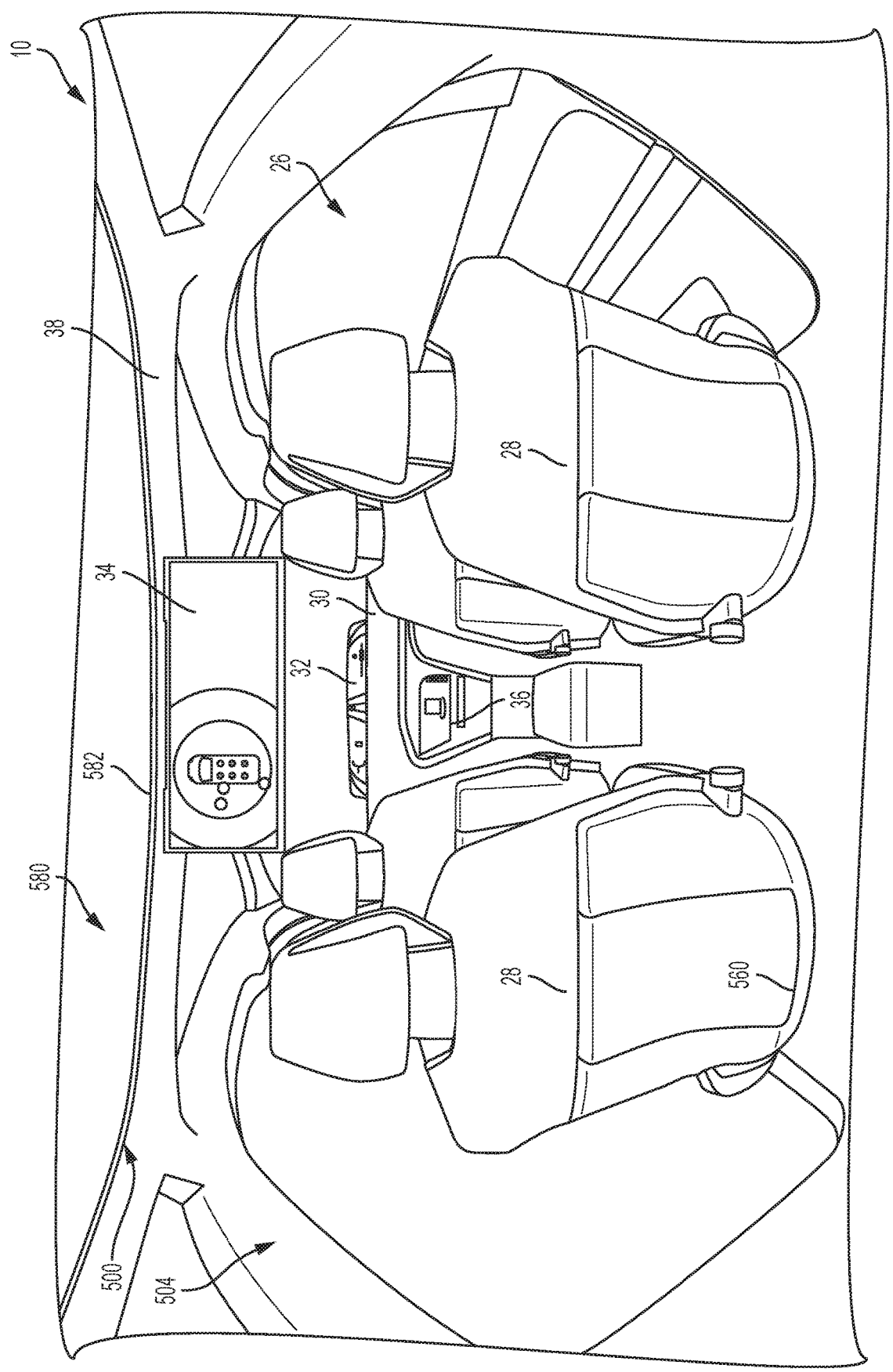
FIG. 3 is a view of an example interior of the vehicles shown in FIGS. 1 and 2, in accordance with the principles of the present disclosure.

With initial reference to FIGS. 1-3, an example vehicle 10 according to various aspects of the present disclosure is illustrated. Vehicle 10 generally includes a front end 14, a rear end 16, and sides 18 each having a door assembly 20. In the example embodiment, door assembly 20 includes a forward door 22 and a rearward door 24 configured to respectively slidably open towards the vehicle front end 14 and rear end 16.

As shown in FIGS. 2 and 3, vehicle 10 includes an interior cabin 26 having a plurality of seats 28, a center stack or instrument panel 30, a high mount display (HMD) 32, and a community screen or display 34. As illustrated, instrument panel 30 includes a center stack or instrument panel screen or display 36. HMD 32 extends upwardly from the instrument panel 30 toward the vehicle windshield and is configured to display various information such as vehicle speed, vehicle direction, and navigation information. In the illustrated example, community display 34 is coupled to and extends downwardly from a vehicle headliner 38. The community display 34 is located in the vehicle interior 26 at a generally central cross-car location and toward the front 14 of the vehicle such many or all of the vehicle passengers (including the driver) are able to view the community display 34.

With reference to FIGS. 4-13, vehicle 10 is configured to include and support upgradable modular systems 50 that enable vehicle owners to seamlessly upgrade specific vehicle components or add additional features to the vehicle 10.

The upgradable modular system 50 comprises a plurality of docking stations 52 each configured to receive one or more upgradable modular components 54. In the example implementation, the modular components 54 are configured to connect to and interface with a central computer or controller 56 via the docking stations 52 located throughout the vehicle 10. The modular docking stations 52 are electrically and/or operably coupled to the vehicle (e.g., vehicle control systems, vehicle power source) and are configured to quickly and easily receive the upgradable modular components 54.

Figure 4:
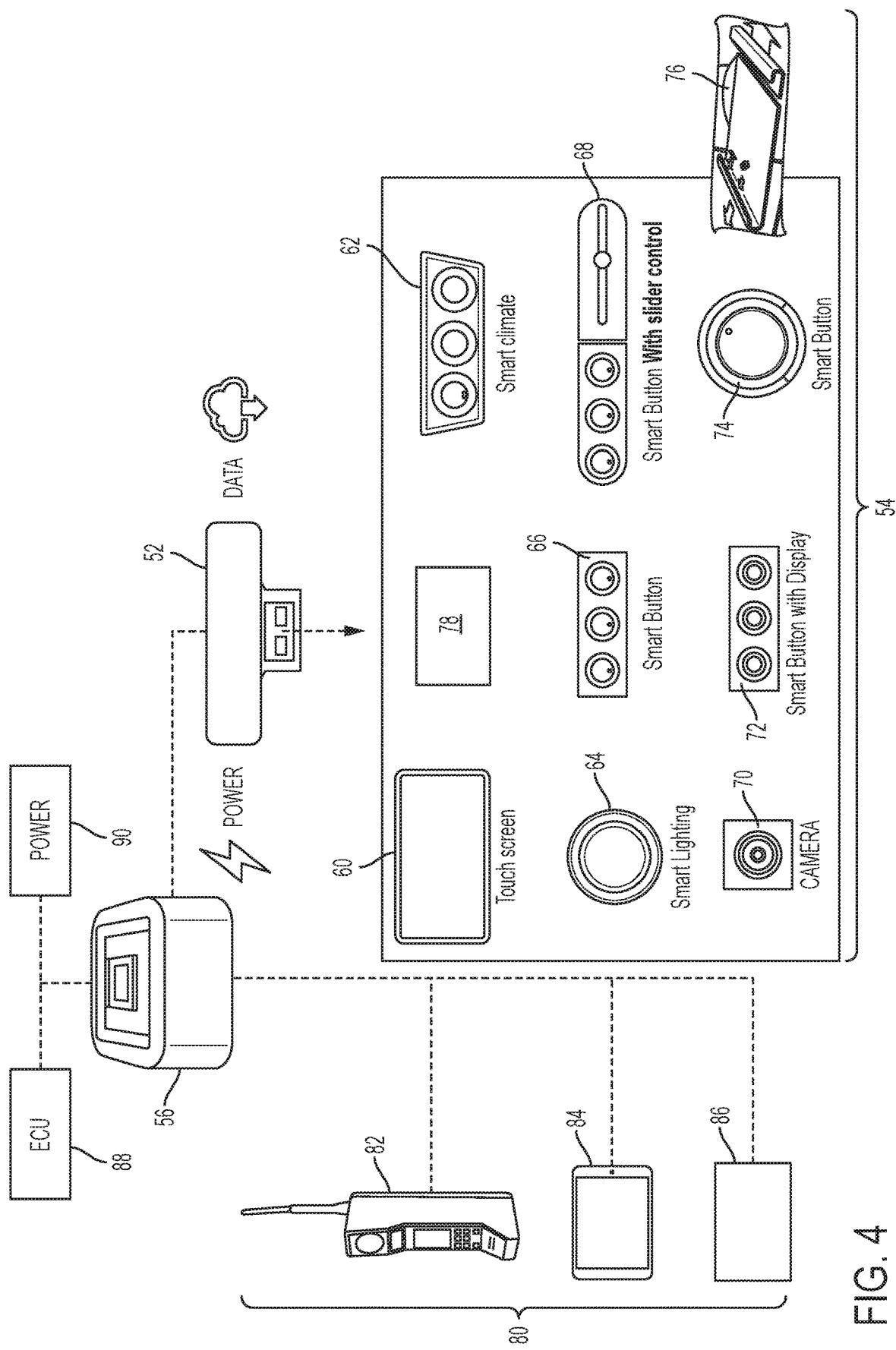
FIG. 4 is a schematic illustration of an example upgradable modular system for a vehicle, in accordance with the principles of the present disclosure.
Figure 5:
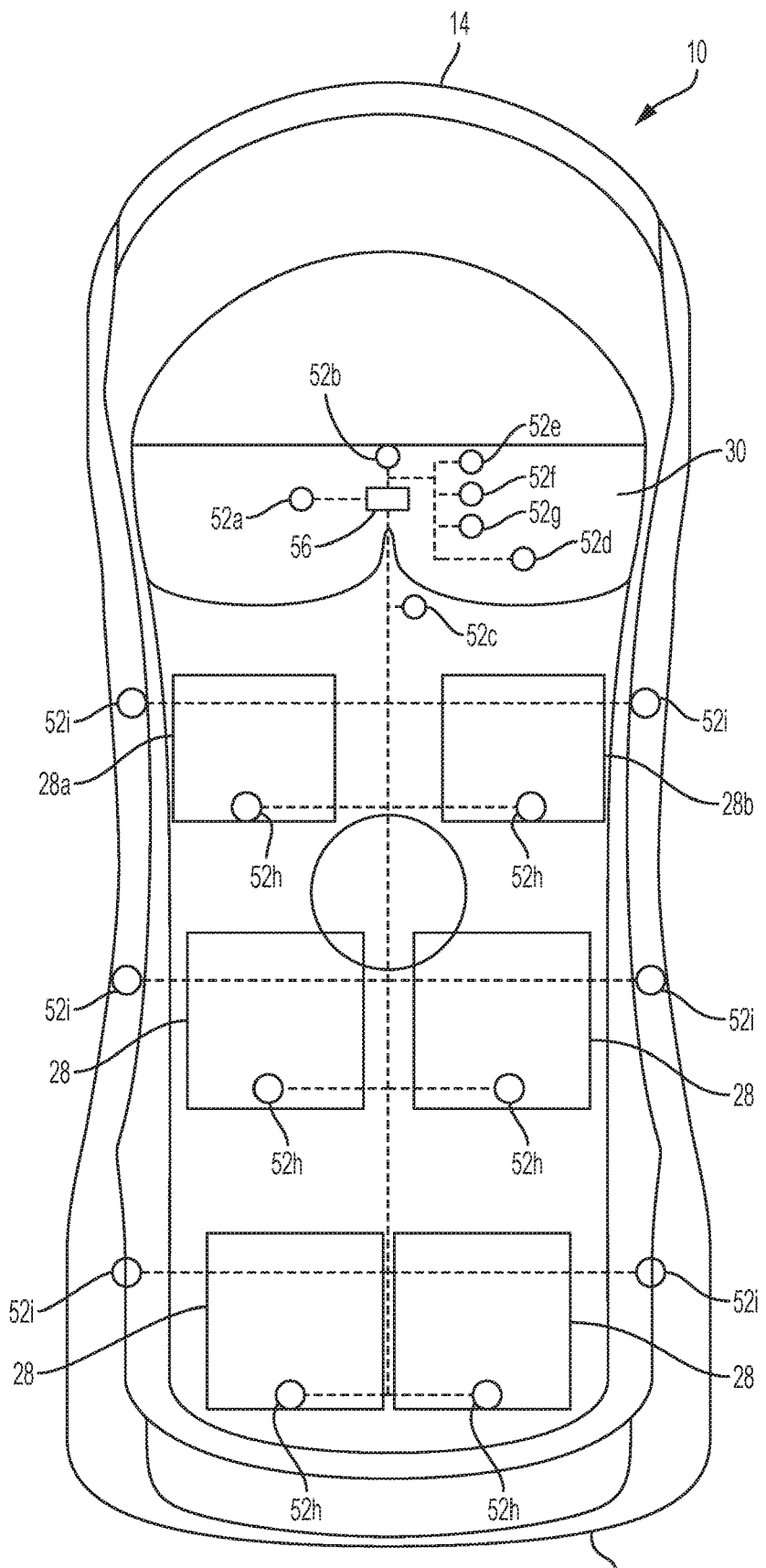
FIG. 5 is a schematic illustration of example docking stations of the upgradable modular system shown in FIG. 4, in accordance with the principles of the present disclosure.

As shown in FIG. 4, a list of upgradable modular components 54 includes central controller 56, displays/touch screens 60, smart climate controls 62, smart lighting 64, smart buttons 66, slide controls 68, cameras/sensors 70, smart buttons with displays 72, a customizable rotate button 74, and a device holder or support 76. However, modular components 54 are not limited to the described list and it will be appreciated that additional upgradable components 78 can be provided for operably coupling with docking stations 52. Moreover, in the illustrated example, central controller 56 is configured to connect with peripheral (e.g., external) user devices 80 such as smart phones 82, tablets 84, or other personal user devices 86, as described herein in more detail.

In the illustrated example, the upgradable modular components 54 are in electrical and signal communication with the central controller 56 through the docking stations 52. In this way, central controller 56 provides both a power source and a data connection to the docked modular components 54.

With continued reference to FIG. 4, central controller 56 is electrically coupled to vehicle control systems 88 (e.g., engine control unit) and a vehicle power source 90. Central controller 56 is configured to operably connect to various devices throughout the vehicle, such as the docked (e.g., operably coupled) modular components 54 as well as the peripheral user devices 80. Moreover, in the example embodiment, central controller 56 is a universal entrapment device configured to automatically entrap or connect to various devices (e.g., smart phone 82) located within the vehicle interior 26 or within a predefined range of the controller 56 or vehicle 10. As such, controller 56 is configured or programmed to operably connect to various devices and perform various tasks and functions based on interactions between the various devices, as described herein in more detail.

In the example implementation, controller 56 is configured to interact with one or more modular components 54 and peripheral user devices 80 via an associated program or application. The program/application may be downloaded, for example, from an online application store and subsequently stored on a device memory (not shown). The program/application is configured to provide a user interface that enables the user to interact with controller 56 and various modular components 54 and peripheral user devices 80. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Docking stations 52 are located throughout the vehicle 10 in convenient and accessible locations. For example, with particular reference to FIG. 5, docking stations 52 are configured to be located in/on: the vehicle dashboard 42 in front of the driver seat 28a (52a), the top of vehicle dashboard 42 (52b), the instrument panel 30 (52c), the vehicle dashboard 42 in front of the passenger seat 28b (52d), a forward location proximate the vehicle headliner 38 (52e), an intermediate location proximate vehicle headliner 38 (52f), a rearward location proximate vehicle headliner 38 (52g), in the rear of one or more vehicle seats 28 (52h), and in the interior surface of vehicle doors 22, 24 and/or armrests

40 (52*i*). However, it will be appreciated that docking stations 52 may be included in other locations throughout the vehicle such as in vehicle headliner 38 above passengers or under the vehicle hood (not shown).

Figure 6:
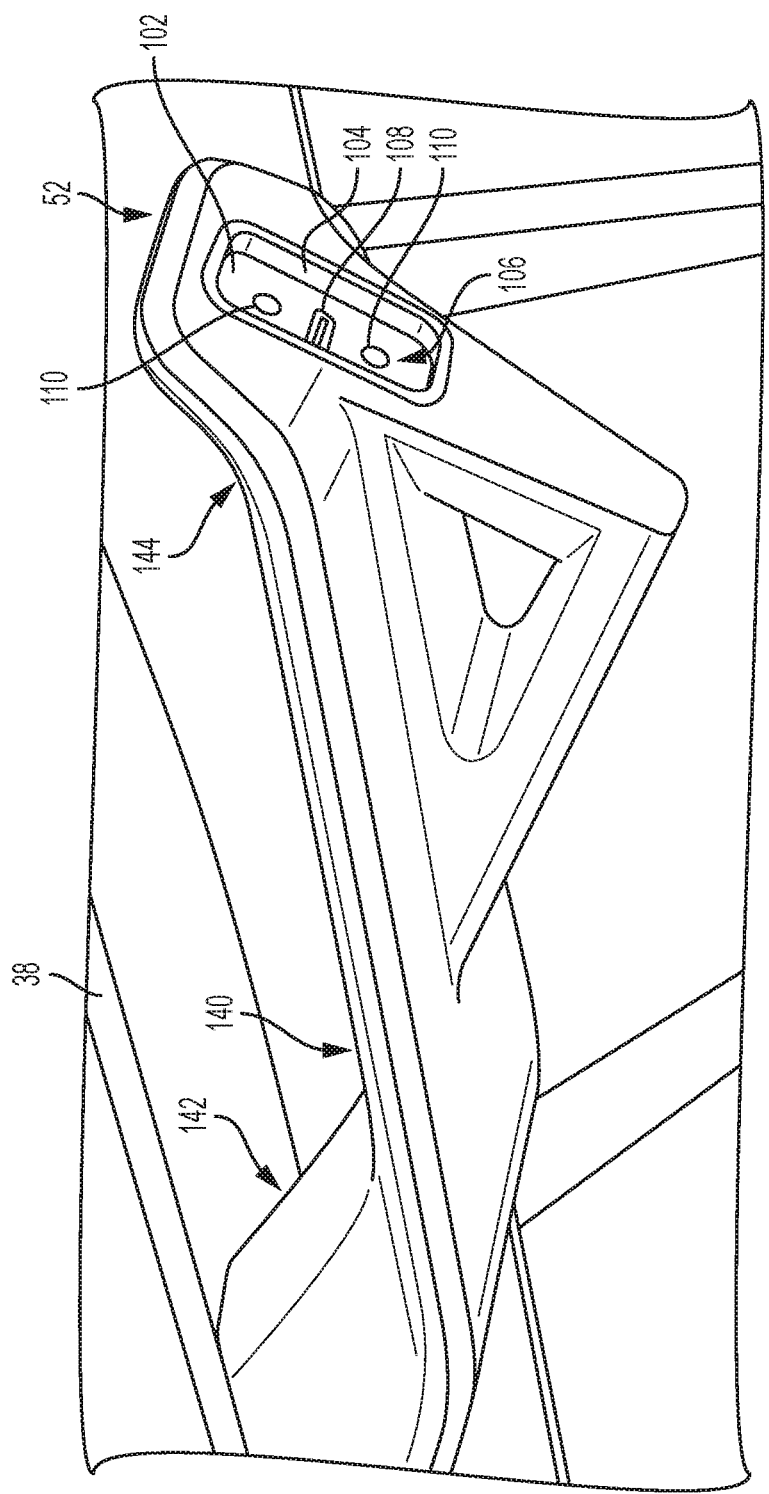
FIG. 6 is a perspective view of another example docking station of the upgradable modular system shown in FIGS. 4 and 5, in accordance with the principles of the present disclosure.
Figure 7:
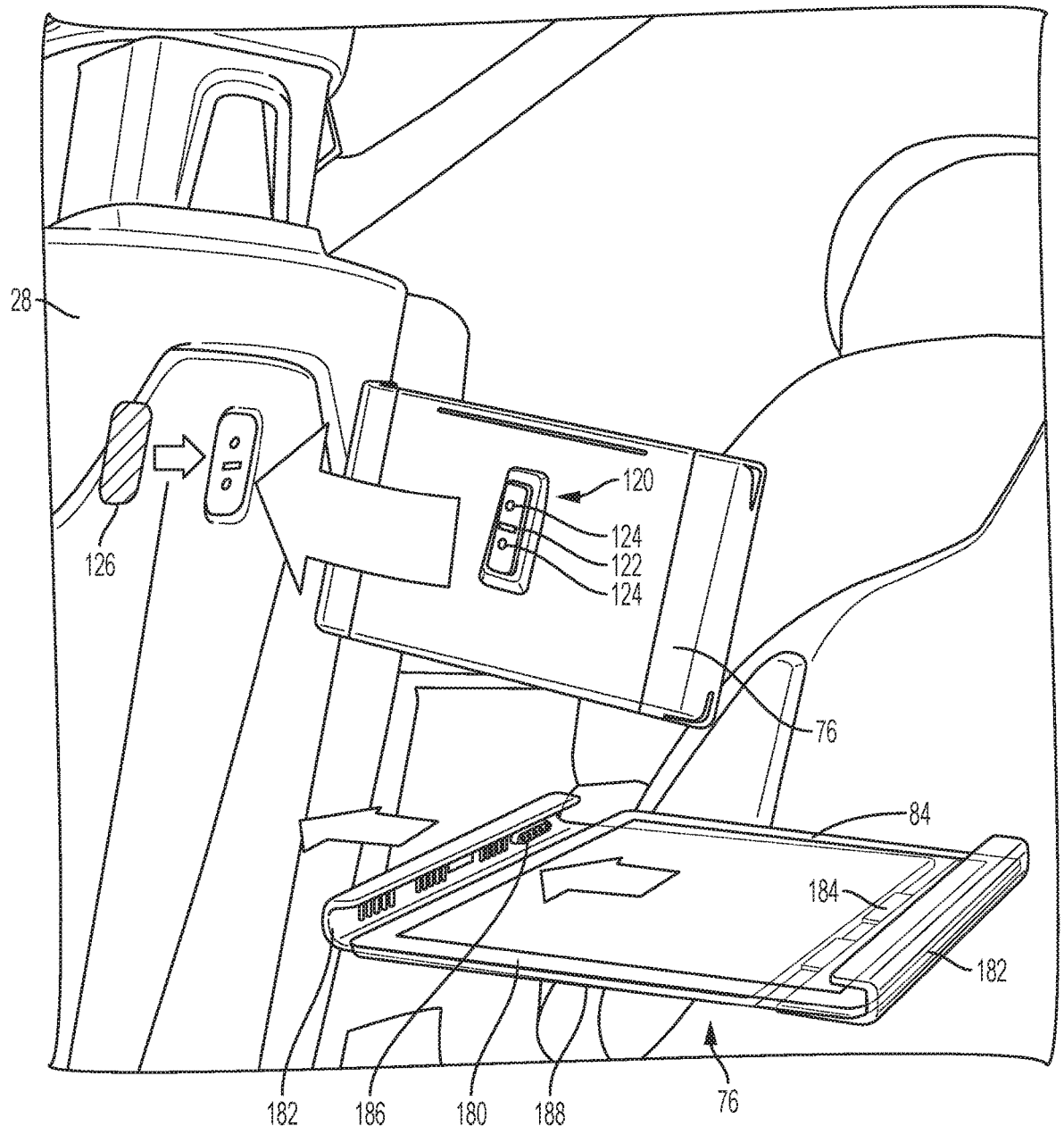
FIG. 7 is a perspective view of an example docking station of the upgradable modular system shown in FIGS. 4 and 5, in accordance with the principles of the present disclosure.

With further reference to FIGS. 6 and 7, docking stations 52 will be described in more detail. With particular reference to FIG. 6, each docking station 52 generally includes a recessed surface 102 surrounded by in interior wall 104 to define a receiving area or docking port 106. While docking station 52 is illustrated as generally rectangular, it will be appreciated that docking station 52 can have various shapes. Recessed surface 102 includes one or more connectors or ports 108 and one or more magnets 110. Port 108 is in electrical and/or signal communication with central controller 56 to thereby provide power and/or data to the attached modular component 54. In the example embodiment, port 108 is a USB port, however, other types of ports/connectors are contemplated. Magnets 110 are located on either side of port 108 and are configured to magnetically couple to the docked modular component 54 or other object.

In one example shown in FIG. 7, modular component 54 includes an insertion portion 120 configured to be received within docking port 106. Insertion portion 120 is generally complimentary in shape to receiving area 106 and includes one or more connectors or plugs 122 and one or more magnets 124. Plug 122 (e.g., a USB plug) is configured to be matingly received within port 108 to establish electrical and/or signal communication with central controller 56. Magnets 124 are located on either side of plug 122 and are configured to magnetically couple to docking station magnets 110. While docking station 52 is described utilizing a magnetic coupling, it will be appreciated that other coupling arrangements are envisioned. Additionally, when not in use, docking station 52 is configured to include a removable cover 126 to cover docking port 106, for example, to protect USB port 108 from damage.

As shown in FIGS. 2-4, upgradable modular components 54 includes upgradable displays/touch screens 60 such as HMD 32, community display 34, and instrument panel display 36. The upgradable nature of the displays/touch screens 60 enables a user to upgrade the size, style, model, etc. of the displays/touch screens 60 to enable a unique, user-defined arrangement.

In the illustrated embodiment, HMD 32 is docked (e.g., operably coupled) with docking station 52*b*, and community display 34 is docked with docking station 52*f*. As shown in FIG. 2, docking station 52*b* is located on an upper surface 44 of dashboard 42 such that HMD 32 is disposed along upper surface 44 in a position to be viewed by at least the driver.

As shown in FIG. 6, docking station 52*f* is disposed on a support arm 140 that includes a proximal end 142 and a distal end 144. The support arm proximal end 142 is coupled to vehicle headliner 38, and support arm distal end 144 includes the docking station 52*f* thereon. Such an arrangement enables community display 34 to be positioned for viewing one or more vehicle occupants.

Figure 8:
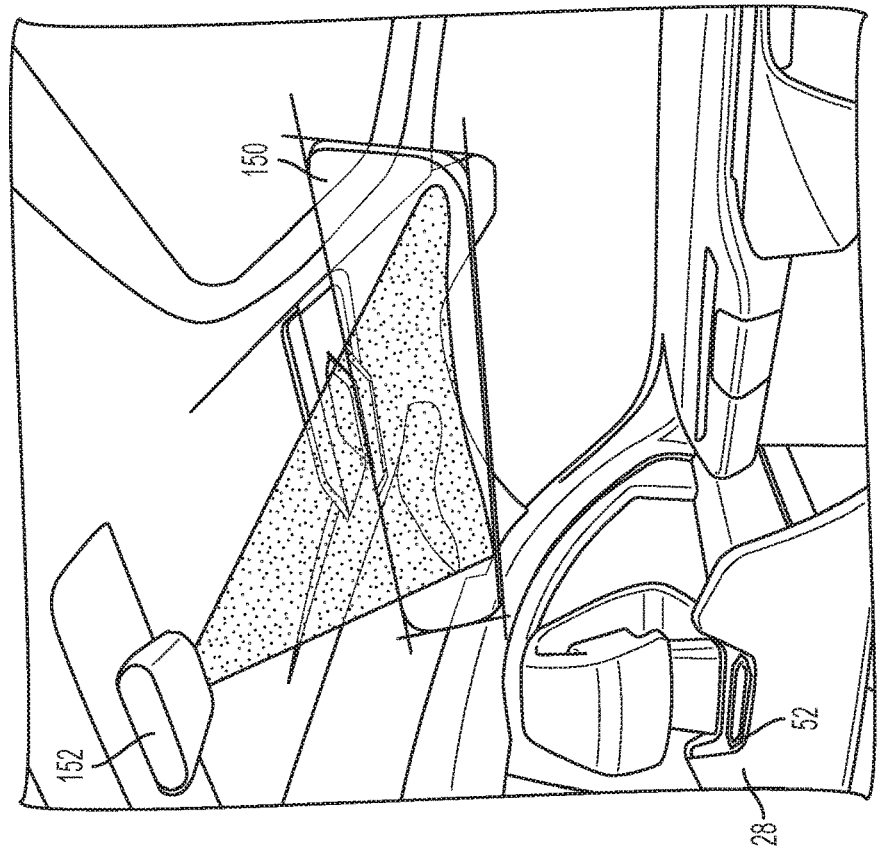
FIG. 8 is a perspective view of example upgradable modular components of the upgradable modular system show in FIGS. 4 and 5, in accordance with the principles of the present disclosure.

In other configurations, shown in FIG. 8, the upgradable displays/touch screens 60 include a display or screen 150 and a projector 152. In one example, the screen 150 is docked with docking station 52*f*, and the projector 152 is docked with the docking station 52*g*. In this arrangement, projector 152 is configured to project picture/video onto screen 150 and thereby function in a manner similar to community display 34.

Figure 9:
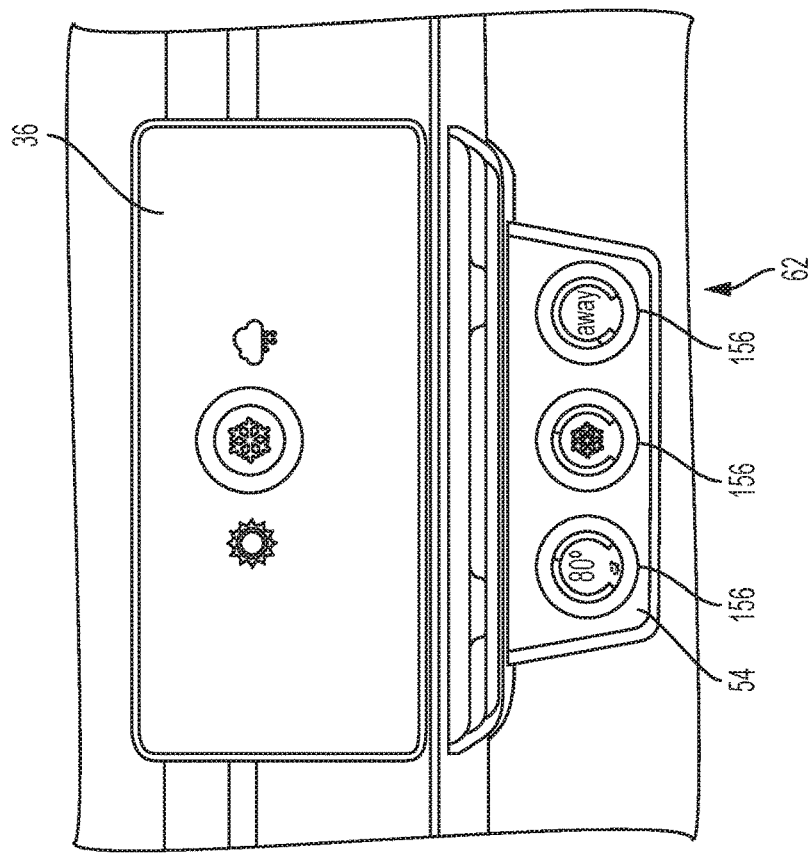
FIG. 9 is a front view of another example upgradable modular component of the upgradable modular system show in FIGS. 4 and 5, in accordance with the principles of the present disclosure.

As shown in FIG. 9, upgradable modular components 54 includes smart climate controls 62. In the example embodiment, the smart climate controls 62 are configured to replace common manual climate control buttons/dials (not shown). In one example, smart climate controls 62 are configured to dock in docking station 52*c* located on or near instrument panel display 36. As such, the smart climate controls 62 are operably connected to the central controller 56 and/or other vehicle control systems (e.g., an HVAC system) to provide manual climate control. In the illustrated example, smart climate controls 62 include a display or screen 154 configured to display soft buttons 156 that resemble manual controls such as HVAC controls, seat heating/ventilation, and user status (e.g., in the car, away from the car, etc.). However, since soft buttons 156 are digitally displayed, their look and/or function can be customized using an associated smart climate control program or application.

Moreover, in addition to manual climate control as in typical vehicles, the smart climate controls 62 and associated app/program are configured to learn a user's manual control behavior and preferences and automatically perform such controls. For example, if the smart climate controls 62 notice that a user prefers a cooler vehicle after leaving a particular location (e.g., a gym), controls 62 can automatically adjust the vehicle climate to the preferred temperature. In other examples, smart climate controls 62 adjust operation/temperature based on the time of day, number of people in the vehicle, location of the vehicle, outdoor temperature, and/or various other conditions. Further, the program/application is configured to enable a user to control vehicle climate remotely, for example, from smart phone 82.

Figure 11:
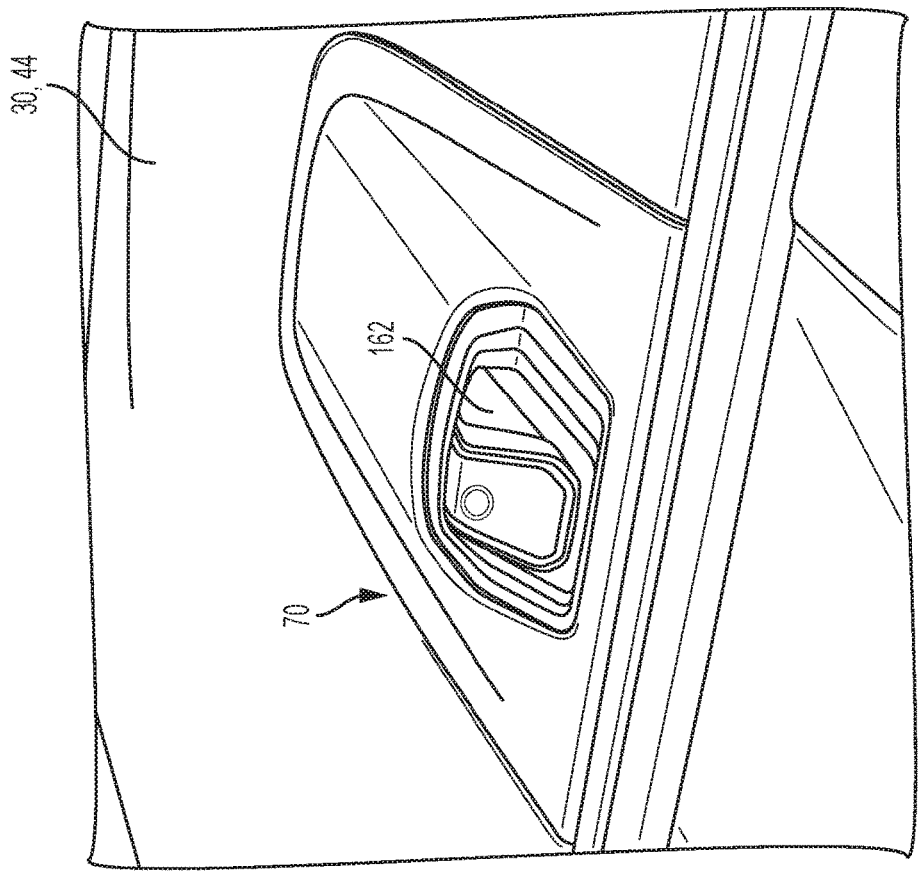
FIG. 11 is a perspective view of another example upgradable modular component of the upgradable modular system show in FIGS. 4 and 5, in accordance with the principles of the present disclosure.
Figure 10:
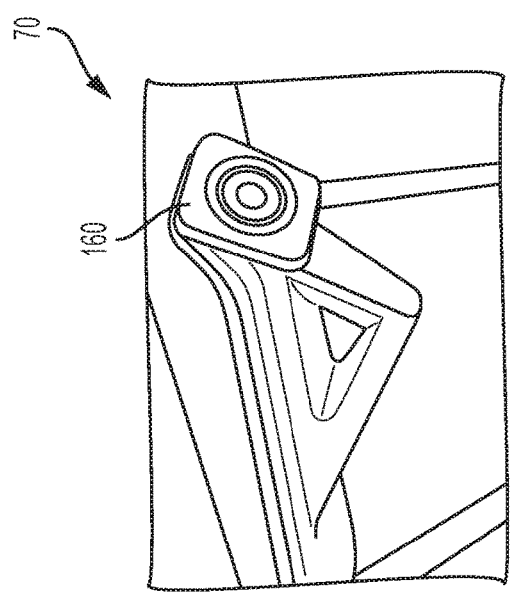
FIG. 10 is a perspective view of another example upgradable modular component of the upgradable modular system show in FIGS. 4 and 5, in accordance with the principles of the present disclosure.

As shown in FIGS. 10 and 11, the upgradable modular components 54 include cameras/sensors 70 such as, for example, a video camera 160 (FIG. 10) and a combination biometric face scanner and eye-tracker 162 (FIG. 11). The video camera 160 is configured to dock with docking stations 52 to provide views of a particular location in the vehicle 10. In one example shown in FIG. 2, video camera 160 includes a rearview mirror 164 and is configured to dock with docking station 52*e* located on the distal end of a forward support arm 166. As such, video camera 160 is configured to provide pictures/video of all occupants in the car (e.g., enables ability to take group photos).

In another example, video camera 160 is docked with docking station 52*h* to provide video of a particular occupant or area in the rear seats 28. Once connected, the central controller 56 is configured to selectively display pictures/video on one of the in-vehicle displays 60. As such, the driver and/or designated user can monitor areas within the vehicle. For example, the driver can monitor a child sitting in third row seats from the driver seat, or the driver can monitor the vehicle interior remotely (e.g., from a smart phone) such as to check if a purse was left in the vehicle 10.

Figure 12:
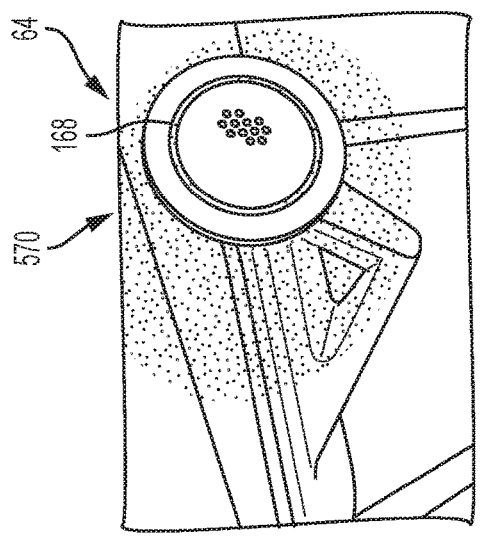
FIG. 12 is a perspective view of another example upgradable modular component of the upgradable modular system show in FIGS. 4 and 5, in accordance with the principles of the present disclosure.

FIG. 12 illustrates combination biometric face scanner and eye-tracker 162 configured to dock with docking stations 52. In one example, biometric face scanner and eye-tracker 162 is docked with docking station 52*a* on the dashboard 42 generally in front of the driver. The face scanning function is configured to scan an occupant's face and provide resulting information to central controller 56. In this way, central controller 56 utilize the biometric face scanner 162 to identify a user. Controller 56 is configured to subsequently perform various functions based on permissions set for that user such as, for example, turn lights on/off, automatically start the vehicle, load a user profile, automatically adjust the climate.

The eye-tracking function is configured to monitor the driver's eyes to estimate driver reaction time and similarly provide the resulting information to central controller 56. In this way, central controller 56 is configured to estimate a driver's reaction time, which may be utilized when the vehicle 10 requests the driver to take over control while vehicle 10 is operating in a self-driving mode. For example, based on readings from sensor/camera 162, central controller 56 provides more advanced warning to a sleeping driver than a driver who is awake and looking in front of the vehicle.

As shown in FIG. 12, upgradable modular components 54 include smart lighting 64 having a customizable light 168 configured to be controlled to produce a desired color and brightness. In the illustrated example, customizable light 168 is an overhead dome light docked with docking station 52f. A user can use an in-vehicle device (e.g., display 60) or peripheral device 80 to control the smart lighting 64. Moreover, central controller 56 is configured to learn and/or be programmed to automatically adjust color/brightness depending on various vehicle conditions (e.g., a certain color for certain music genres, visual feedback of a direction of a voice in the vehicle, an emergency vehicle is approaching, etc.).

With continued reference to FIG. 4, upgradable modular components 54 include smart buttons 66, slide controls 68, smart buttons with displays 72, and customizable rotate buttons 74, each of which can be coupled to docking stations 52 in various locations throughout the vehicle. Each of the buttons/slides 66, 68, 72, 74 may include any suitable number of buttons/slides. Moreover, the buttons/slides 66, 68, 72, 74 are configured to be programmed through an associated application/program to thereby provide control for one or more specific vehicle function such as, but not limited to, garage door control, home climate controls, home door lock controls, in-vehicle passenger to passenger communications (e.g., intercom), light controls, voice controls, climate controls, seat heating/ventilation, location information, navigation features, etc. Additionally, in some implementations, buttons/slides 66, 68, 72, 74 are configured to change assignment/function depending on a user's proximity thereto. For example, buttons 72 may provide a first set of functions/controls when a first user profile is detected in proximity (e.g., passenger #1), and subsequently provide a different, second set of functions/controls when a second user profile is detected in proximity (e.g., passenger #2).

Figure 13:
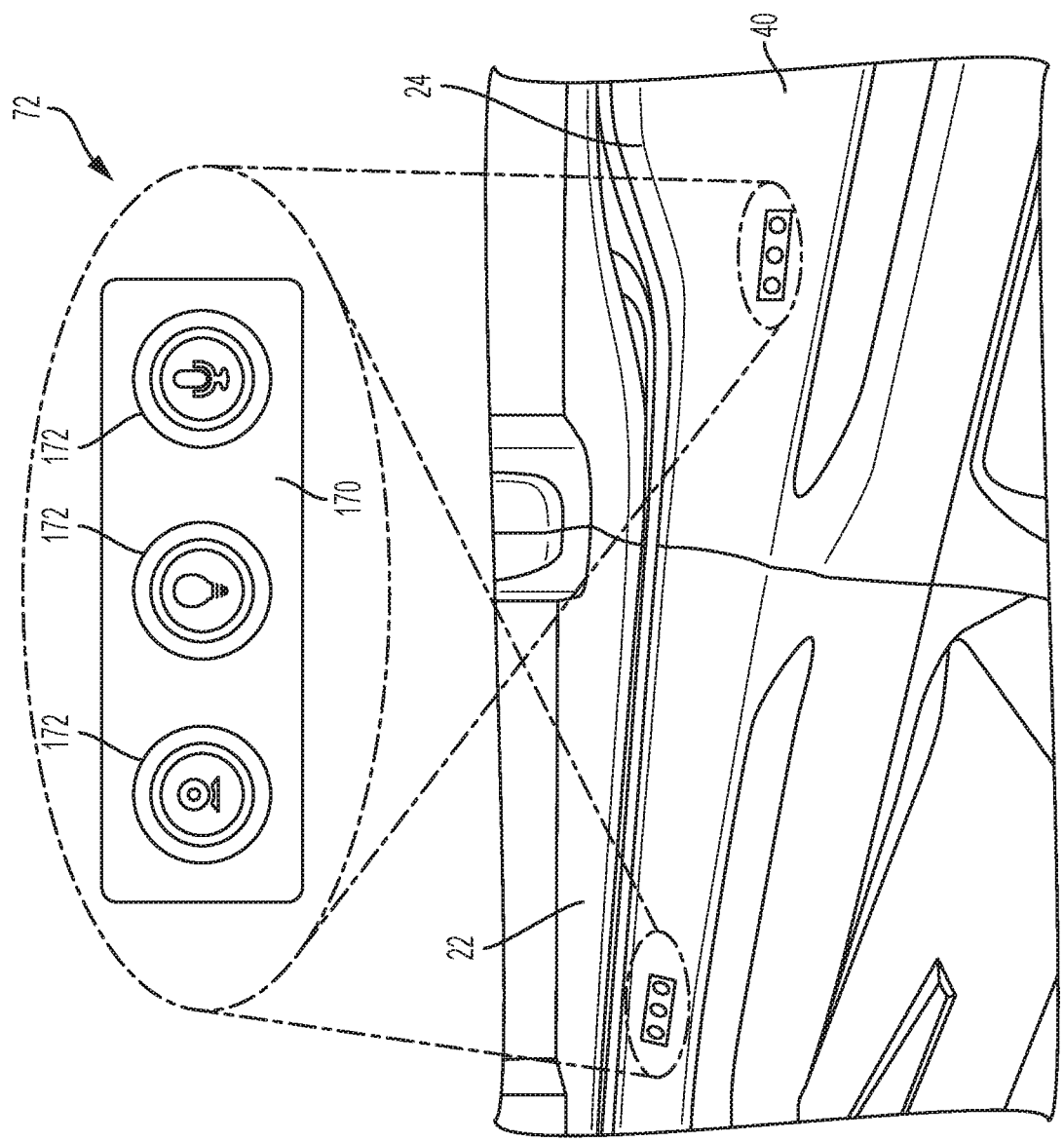
FIG. 13 is a perspective view of another example upgradable modular component of the upgradable modular system show in FIGS. 4 and 5, in accordance with the principles of the present disclosure.

In the example embodiment, smart buttons 66 and slide controls 68 comprise physical buttons/dials that can be programmed to perform a particular function using the associated application or program. In contrast, smart buttons with displays 72 comprise a display or screen 170 configured to display one or more soft buttons 172. Since soft buttons 172 are digitally displayed on screen 170, their look and/or function can be customized using the associated program or application. FIG. 13 illustrates smart buttons with displays 72 docked in docking stations 52i located on the vehicle doors 22, 24.

In the example embodiment, customizable rotate button 74 is a physical, rotatable button configured to dock with docking stations 52. In one example, the rotate button 74 is configured to dock with docking station 52c on or near the instrument panel display 36. The rotate button 74 is configured to rotate and can be programmed through the associated app/program to control one or more specific vehicle functions such as, but not limited to, navigation zoom, contact list browsing, HVAC fan speed, navigation destinations, seat heating/ventilation, and vehicle lighting. Accordingly, the driver/passenger can customize the rotate button 74 to control specific desired vehicle functions.

With continued reference to FIGS. 4 and 7, upgradable modular components 54 include device support 76 configured to hold and position one or more peripheral device 80 such as mobile phone 82 or tablet 84. In the example embodiment, device support 76 includes a base or backing 180 disposed between opposed device retainer end panels 182, which are slidingly coupled to backing 180 via guide plates 184. As such, device retainer end panels 182 are telescopically movable toward and away from backing 180 in order to adjust for various sized peripheral devices 80. Additionally, at least one of the end panels 182 includes a device connector port 186 (e.g., USB port) to enable signal/electrical coupling to the peripheral device 80. A rear surface 188 of the backing 180 includes the insertion portion 120 that is configured to be received within docking port 106. Plug 122 (e.g., a USB plug) is configured to be matingly received within port 108 to establish electrical and/or signal communication between central controller 56 and the device connector port 186.

As previously mentioned, each modular component 54 can include one or more applications or programs associated with that particular modular component. In some implementations, the app/program is specific to that modular component 54. In other implementations, a plurality of modular components 54 operate and/or are controlled by a common application/program such as a community application described herein in more detail. Such applications/programs may be downloaded, for example, from an online application store and subsequently stored on a device memory (not shown) of the device. As previously described, such programs/applications are configured to provide a user interface that enables the user to interact with controller 56 and various modular components 54 and peripheral user devices 80.

In one example method of operation, when docked (e.g., for the first time), central controller 56 detects the newly installed modular component 54 and uploads any associated software to subsequently provide user functionality and control through the application/program. A user may then download the app/program to a user device or vehicle infotainment center. The application/program then provides control of the new modular component through one or more other modular components 54 (e.g., screens 60) or peripheral device 80 (e.g., smart phone 82).

As such, vehicle 10 provides a plurality of docking stations 52 throughout the vehicle for providing power and data connection to various upgradable modular components 54 and peripheral devices 80. The modular components 54 and peripheral devices 80 are able to connect with each other via (as well with) the central controller 56 to provide various function and control. In this way, a user can seamlessly upgrade or modify the vehicle to provide a customized driving experience.

Figure 14:
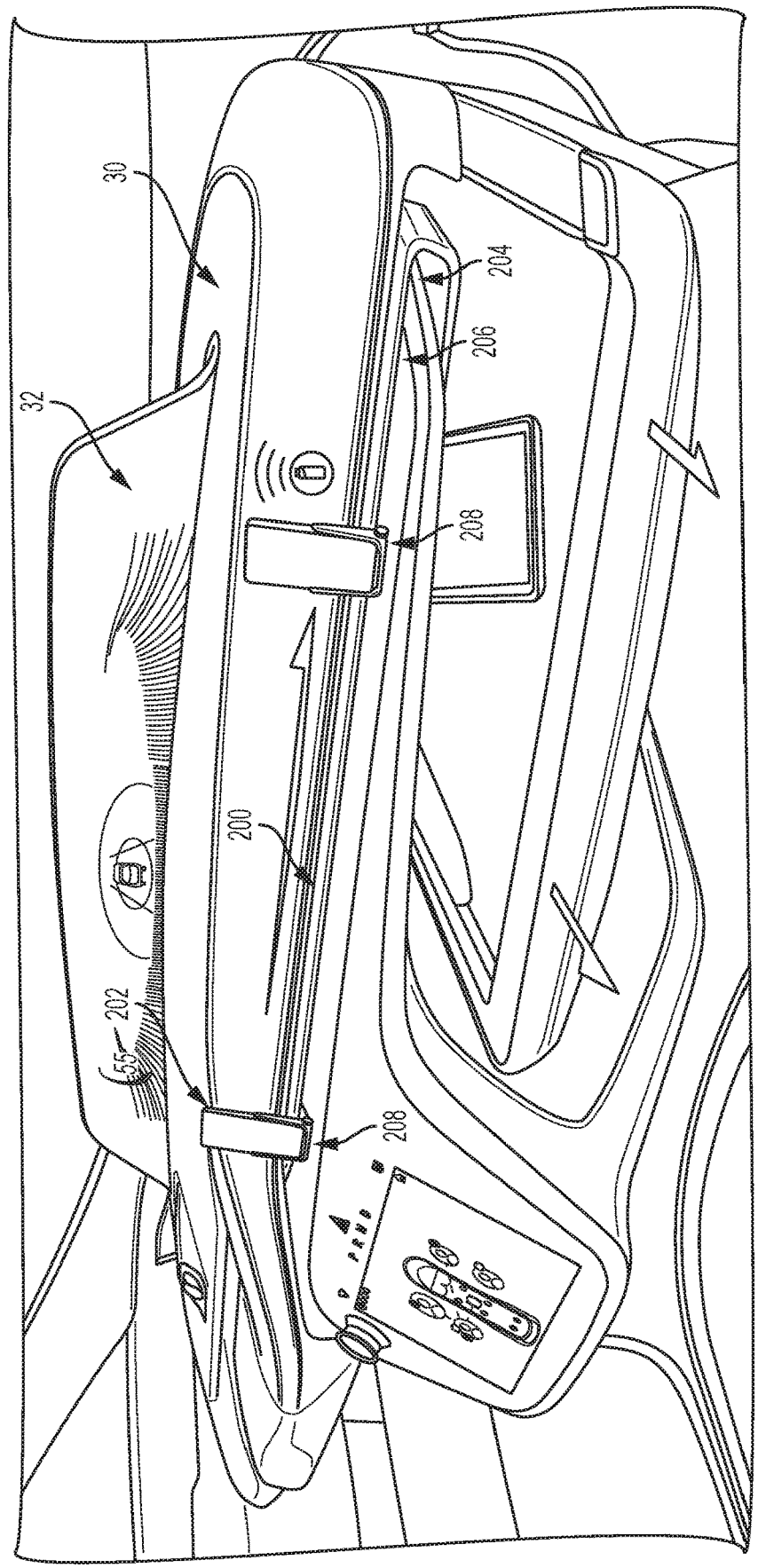
FIG. 14 is a perspective view of an example charge rail system for a vehicle, in accordance with the principles of the present disclosure.

With reference to FIGS. 14 and 15, vehicle 10 further includes a charge rail system 200 configured to configured to hold and charge a personal electronic device such as a phone device 202. The charge rail system 200 is operably associated with vehicle instrument panel 30, which, as shown in FIG. 14, includes a vent 204 having an outlet vane 206 extending outwardly therefrom generally toward the vehicle rear 16. The charge rail system 200 generally includes the outlet vane 206 and a charging assembly 208.

With further reference to FIGS. 15A-15D, charging assembly 208 generally includes attachment member 210, a pivot assembly 212, and an inductive charging interface 214. Attachment member 210 is generally V-shaped and includes a first arm 216 and a second arm 218 each configured to slidably couple to outlet vane 206 at one end. However, attachment member 210 may include any number of arms that enables charge rail system 200 to function as described herein. For example, attachment member 210 may have one or three arms.

In one illustrated example, attachment member 210 is slidably coupled to outlet vane 206 by a plurality of ball bearings 220. In another illustrated example, attachment member 210 is slidably coupled to outlet vane 206 by a tongue and groove arrangement 222. However, attachment member 210 may be slidably attached to outlet vane 206 by any suitable means such as, for example, one or more ribs (not shown). In this way, charging assembly 208 can be manually adjusted along a length of the instrument panel 30 (e.g., in a general cross-car direction). Moreover, instrument panel 30 may receive multiple charging assemblies 208 such that multiple devices 202 can be supported/charged simultaneously.

The other end of attachment member 210 is coupled to pivot assembly 212, which is configured to enable angular adjustment of charging interface 214 and thus any attached device 202. Accordingly, the attached device 202 can be adjusted by a vehicle passenger via the pivot assembly 212 to a desired position or viewing angle. In the example embodiment, pivot assembly 212 is a ball and socket arrangement 224. However, pivot assembly 212 may be any suitable assembly that enables angular adjustment of charging assembly 208.

In the example embodiment, inductive charging interface 214 is configured to provide a surface to receive electronic device 202 for inductive charging thereof. In one example, an inductive charging interface 214 includes a housing 226 configured to house a primary induction coil (not shown) that is connected to a power source such as vehicle power source 90. The inductive charging interface 214 may include one or more capacitors (not shown) coupled in series and/or in parallel. The electronic device 202 includes a secondary inductive coil (not shown) selected to match or complement the inductance value of the primary inductive coil. The electronic device 202 may be removably coupled to the inductive charging interface 214 to electrically couple the electronic device 202 to the power source and thereby charge the internal battery of the electronic device 202. In one example, inductive charging interface 214 includes a magnet assembly 228 configured to magnetically couple to a magnet disposed on the electronic device 202. However, charging assembly 208 may have any suitable means for removably attaching device 202 to the inductive charging interface 214.

FIGS. 16A-16C illustrate another example charging assembly 258 configured for use with charge rail system 200. Charging assembly 258 is similar to charging assembly 208 and generally includes attachment member 260, a pivot assembly 262, and an inductive charging interface 264. In the example embodiment, pivot assembly 262 is a hinge and enables inductive charging interface 264 to swing or pivot between an upright position (FIG. 16A) and a flat position (FIG. 16B). The upright position enables inductive charging interface 264 to receive device 202 or a device support (e.g., similar to device support 76), and the flat position enables charging assembly 258 to be moved toward and into the instrument panel 30 into a stowed position (see FIG. 16C).

With reference to FIGS. 17-23, vehicle 10 further includes a community platform 300 that seamlessly interconnects internal devices in the vehicle 10 with external devices brought into the vehicle (e.g., peripheral devices 80). For example, the internal devices include, but are not limited to, central controller 56, HMD 32, community display 34, instrument panel display 36, and vehicle cameras/sensors 70. The external devices include, but are not limited to, personal electronics such as phones 82, tablets 84, laptops (not shown), smart lighting 64, cameras 70, wearables (not shown), home devices (not shown), and other devices 86. As such, the peripheral devices 80 of each passenger are automatically connected to community platform 300 to facilitate communication and sharing therebetween throughout the entire vehicle 10. For example, one camera 70 can be docked in docking station 52 and integrated to operate as a baby monitor displayed on HMD 32, passengers may share media, point of interest (POI), photos, and the like on each other's devices or on the community display 34, and passengers can communicate with each other with enhanced audio zones for each passenger area and live video.

In the example embodiment, community platform 300 is interconnected by a community program or application. The community program/application may be downloaded, for example, from an online application store and subsequently stored on a device memory (not shown). The program/application is configured to provide a user interface that enables the user to interact with community platform 300, controller 56, and various modular components 54 and peripheral user devices 80.

Figure 17:
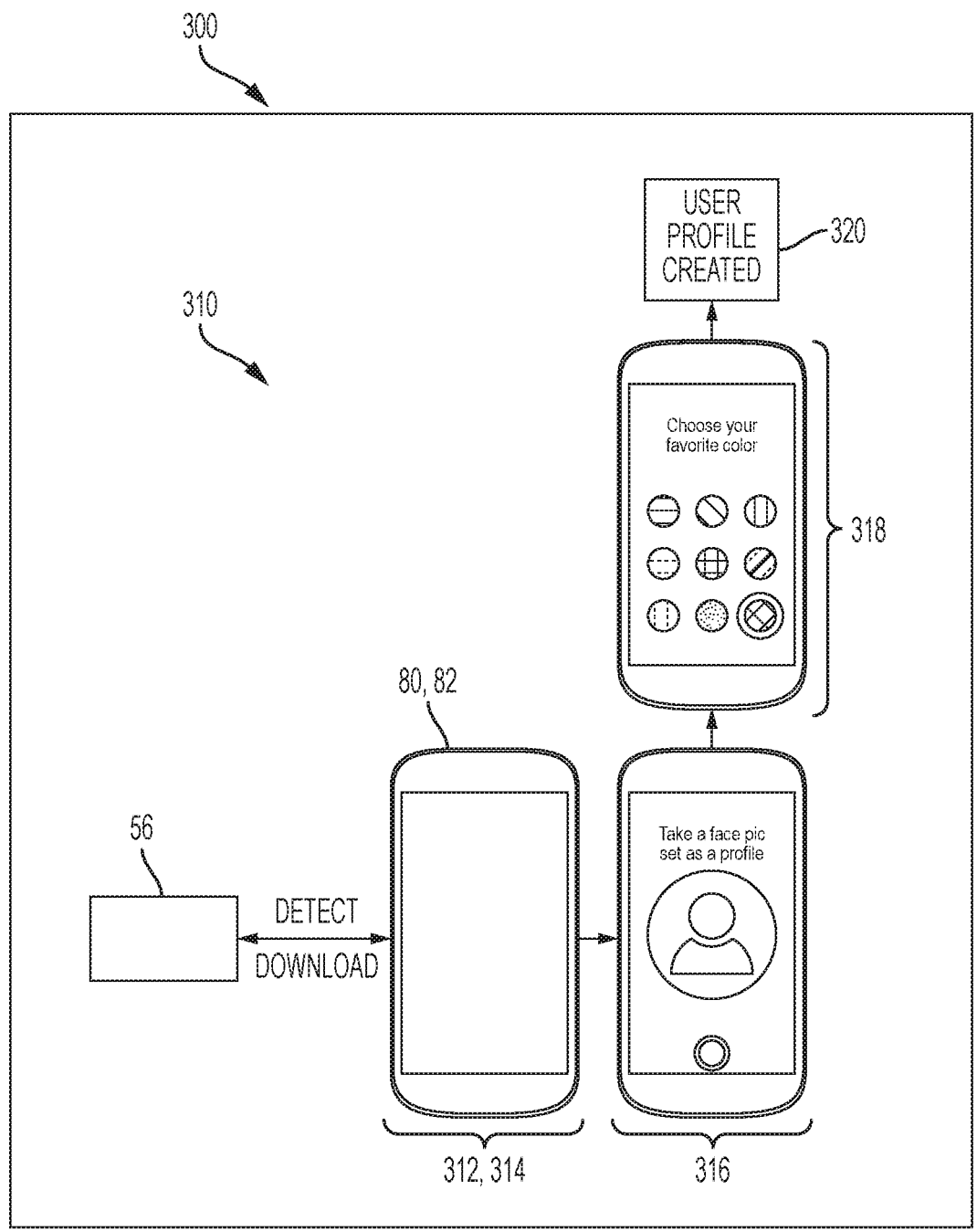
FIG. 17 is a schematic flow diagram illustrating an example control method for a community platform of a vehicle, in accordance with the principles of the present disclosure.

With reference to FIG. 17, one example device connection sequence 310 is illustrated. At step 312, vehicle 10 detects a peripheral device 80 via a detection method such as, for example, facial recognition, voice recognition, Bluetooth, RF, Wi-Fi, etc. If the community application is not already present on the peripheral device 80, at step 314, vehicle 10 (e.g., central controller 56) prompts the device user to download or otherwise install the community application on the peripheral device 80.

At step 316, the community application prompts the device user to take a picture of his/her face for a unique user profile. Once complete, at step 318, the community application prompts the user to choose a color that will be associated with that particular user profile. Once complete, at step 320, a basic unique user profile is created and stored in the vehicle (e.g., central controller 56) and/or in a location accessible to vehicle 10 (e.g., cloud storage). The basic user profile is subsequently built up through user input and data analysis from machine learning of central controller 56.

The basic user profile subsequently enables increased interaction between a user and the vehicle 10. For example, an exterior camera 46 of the vehicle 10 (e.g., see FIG. 1) is configured to detect a user approaching the vehicle 10 based on biometric face-scanning and the user's face picture associated with the user's profile. Upon matching the user's face with the user's profile, vehicle 10 may then perform subsequent operations. For example, upon recognition of the user, vehicle 10 can open doors 22, 24, activate vehicle lights to glow a particular color (e.g., the color associated with the user's profile), and/or provide a display or information to the user (e.g., provide a welcome message). Additional lights (e.g., interior lights) are also configured to glow a particular color (e.g., the color associated with the user's profile), as described herein in more detail.

In other examples where the community application is used to summon vehicle 10 as for-hire transportation (e.g., taxi service, ride sharing, etc.), vehicle lights are configured to glow a chosen or predetermined color (e.g., the color associated with the user's profile). In this way, the user is able to quickly visually identify the vehicle 10 hired through the community application or other associated application/program.

In the example implementation, the community application collects user preferences (data) such as frequently visited destinations, music preferences, food preferences, favorite points of interest, etc. When multiple user profiles are detected in the vehicle 10, a machine learning engine such as central controller 56 is configured to establish a community profile and subsequently provide contextual suggestions based on common interests. For example, when a particular group or family is detected in vehicle 10, central controller 56 is configured to provide suggestions for music, destinations, restaurants, etc. based on common interests or preferences of the individual user profiles.

Figure 18:
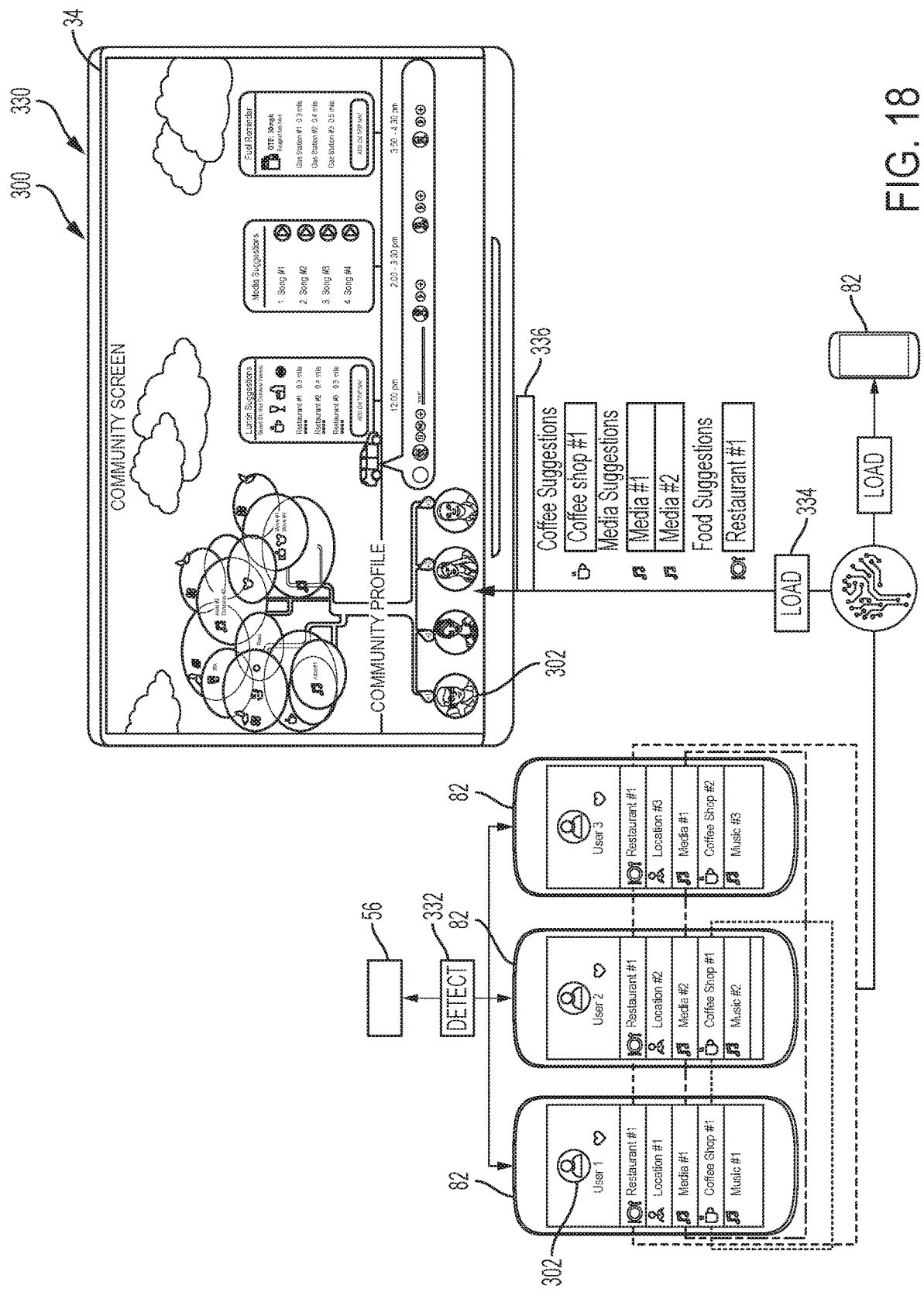
FIG. 18 is a schematic flow diagram illustrating another example control method for the community platform, in accordance with the principles of the present disclosure.
Figure 19:
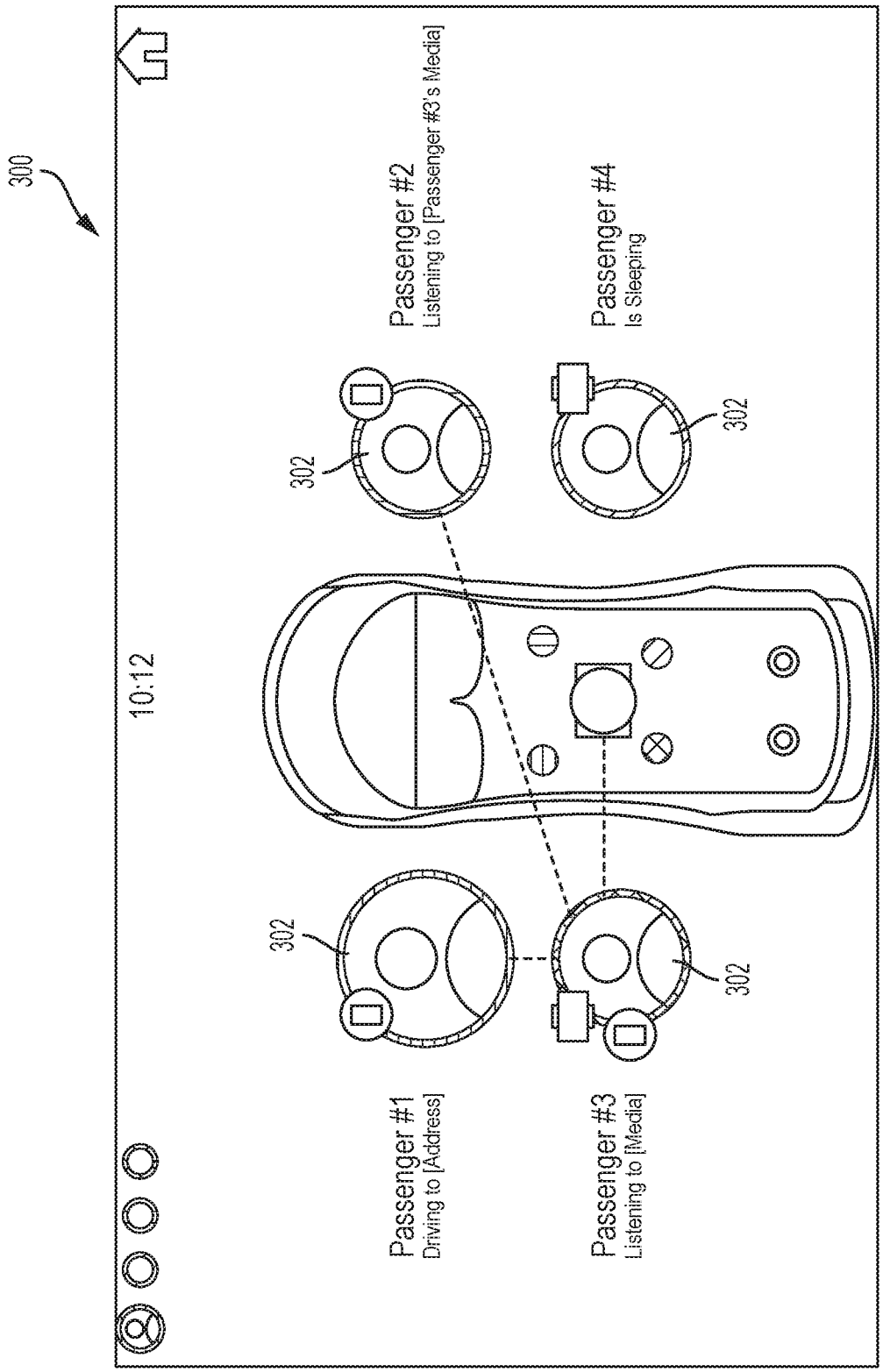
FIG. 19 is a schematic diagram illustrating another example control method for the community platform, in accordance with the principles of the present disclosure.

With reference to FIG. 18, another example device connection sequence 330 is illustrated. At step 332, vehicle 10 detects a plurality of personal devices via a detection method such as, for example, facial recognition, voice recognition, Bluetooth, RF, Wi-Fi, etc. At step 334, each individual profile is loaded and displayed on a vehicle display such as community display 34. For example, community display 34 may display a graphic representation of seats within the vehicle and which persons are in those seats by locating a profile avatar 302 at that seat location (e.g., see FIG. 19). Animations may be utilized with the profile avatars 302 to represent the status or activity of the person associated with the profile avatar 302 (e.g., do not disturb, listening to music, ordering food, etc.). At step 336, community display 34 displays the user profiles, and peripheral devices 80 with the community application load to a home screen and become interactive.

Once the profiles are loaded and connected to each other via the community platform 300, media or communications may be shared throughout the vehicle. For example, vehicle passengers are able to share media, POIs, destination, and photos with each other via peripheral devices 80, community display 34, instrument panel display 36, and/or other passenger screens/displays 60.

Figure 20:
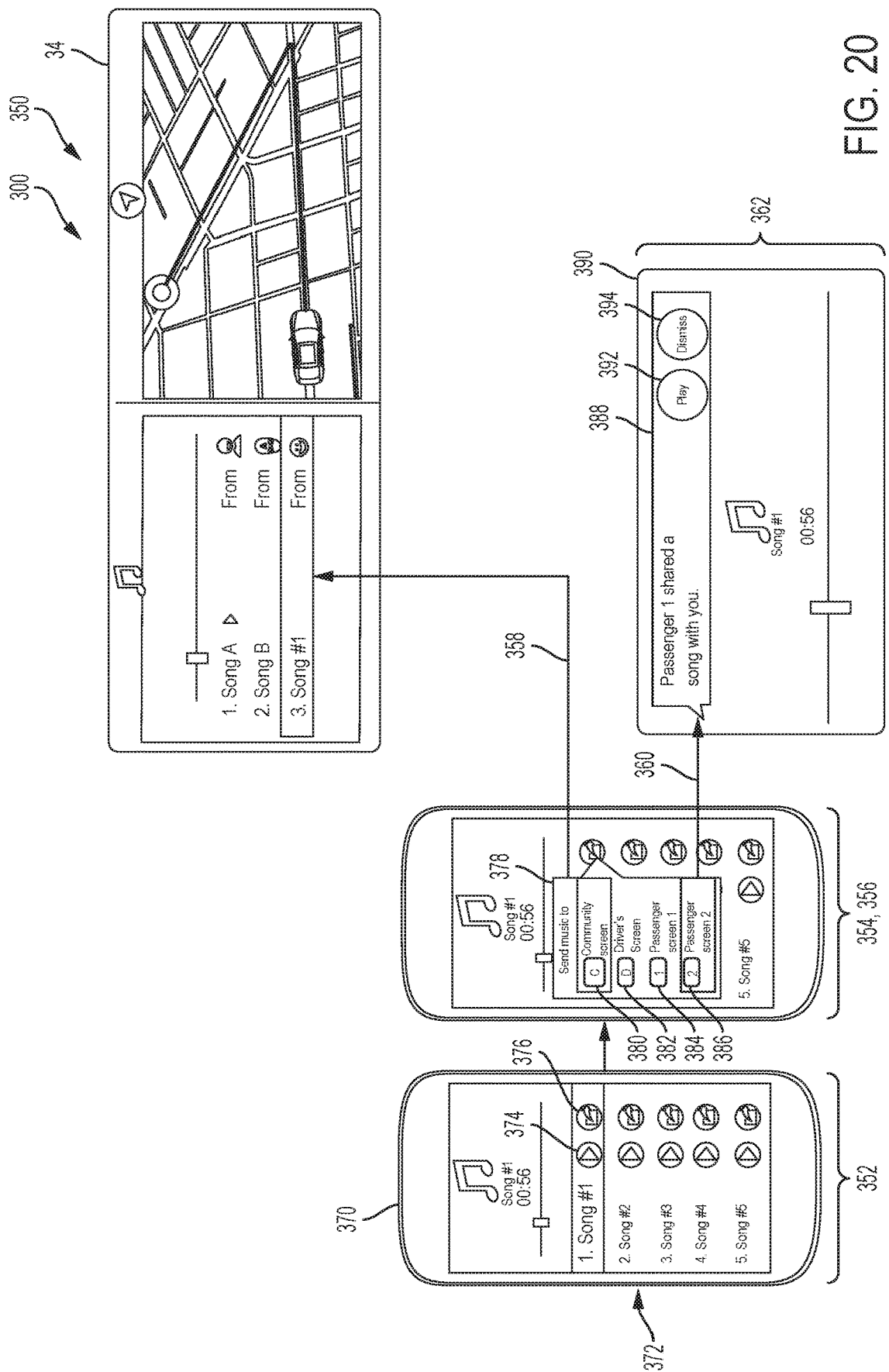
FIG. 20 is a schematic flow diagram illustrating another example control method for the community platform, in accordance with the principles of the present disclosure.

FIG. 20 illustrates one example implementation 350 of community sharing on the vehicle community platform 300 via the community application. It will be appreciated that the illustrated layout and design are merely exemplary and the community platform 300 and community application can have any suitable arrangement that enables community platform 300 and community application to function as described herein. At step 352, a personal device 370 displays a list of media (e.g., songs) 372 with an associated "play" soft button 374 and "share" soft button 376. If the "play" soft button 374 is selected, at step 354, the personal device 370 will play the song on that device 370.

If the "share" soft button 376 is selected, at step 356, a selection menu soft button 378 is displayed to enable the user to determine where or to whom the selected media will be shared. For example, in the illustrated implementation, the selection menu soft button 378 displays four options for sharing the selected media. A first sharing option 380 shares the media to the community display 34 where it can subsequently be accessed/played by the controller of the community display 34 (e.g., the driver) or other authorized users. Accordingly, if the first sharing option 380 is selected, at step 358, the selected media is displayed on the community display for further access/use.

A second sharing option 382 shares the media to the driver's screen (e.g., a personal device or center stack display 36), a third sharing option 384 shares the media to a screen of a Passenger #1, and a fourth sharing option 386 shares the media to a screen of a Passenger #2. At step 360, selecting any of sharing options 382, 384, 386 will then display a media share notification 388 on the selected person's screen 390. At step 362, the media share notification 388 provides the targeted media recipient the option of a "Play" soft button 392 and a "Dismiss" soft button 394. Selecting the "Play" soft button 392 will play/access the shared media on the selected screen 390, and selecting the "Dismiss" soft button 394 will close or remove the media share notification 388 on screen 390.

Figure 21:
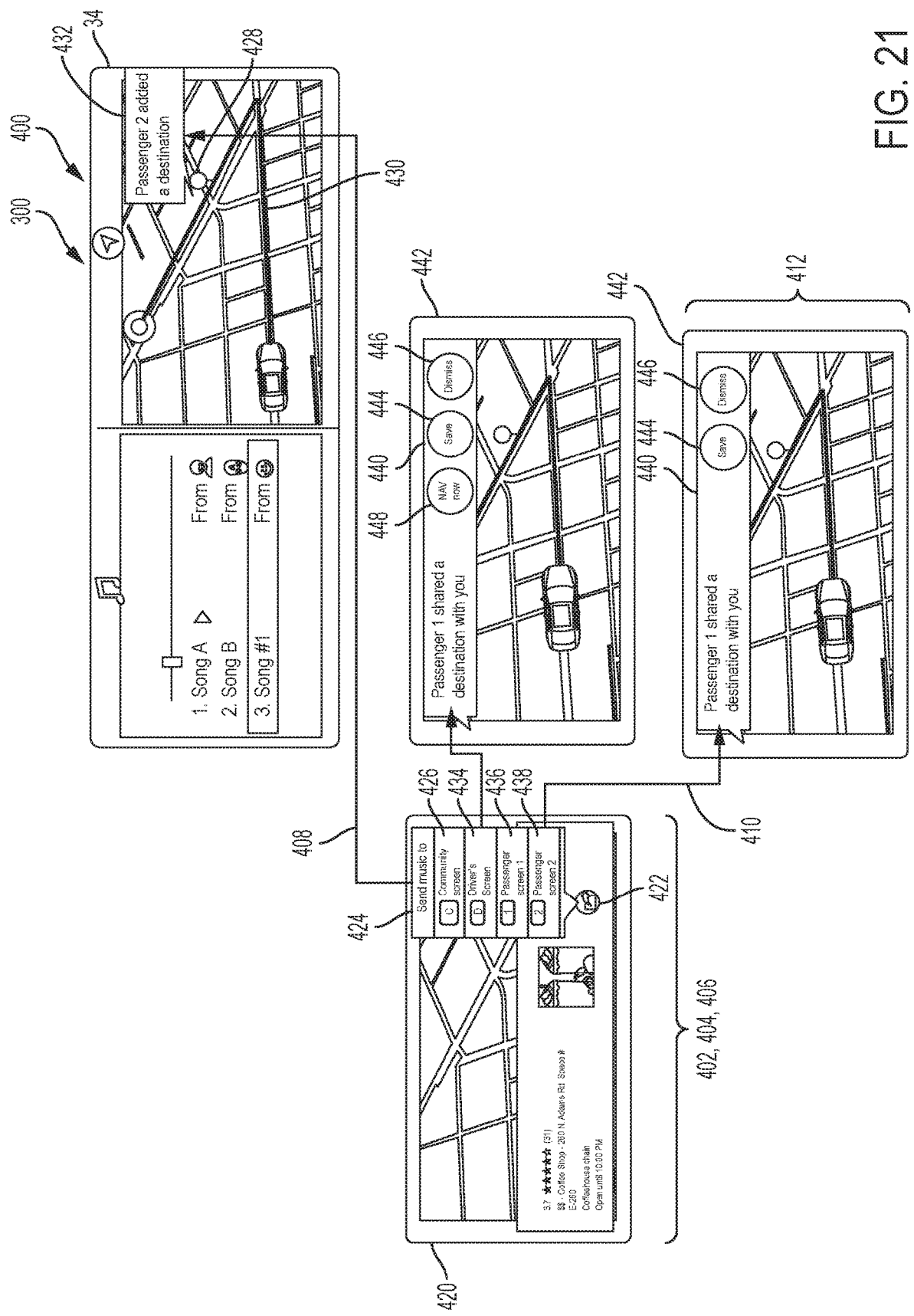
FIG. 21 is a schematic flow diagram illustrating another example control method for the community platform, in accordance with the principles of the present disclosure.

FIG. 21 illustrates another example implementation 400 of community sharing on the vehicle community platform 300 via the community application. It will be appreciated that the illustrated layout and design are merely exemplary and the community platform 300 and community application can have any suitable arrangement that enables community platform 300 and community application to function as described herein. At step 402, personal device 420 displays a POI or a destination. For example, a user may desire to stop at a particular establishment for a coffee, or a user may desire to exit a ride share at a desired location.

At step 404, the user selects the POI/destination and a "share" soft button 422 is displayed. At step 406, selecting the "share" soft button 422 displays a selection menu soft button 424 to enable the user to determine where or to whom the selected POI/destination will be shared. For example, in the illustrated implementation, the selection menu soft button 424 displays four options for sharing the selected media. A first sharing option 426 shares the POI/destination to the community display 34 where it can be viewed and subsequently utilized by the authorized use of the community display 34 (e.g., the driver) or other authorized users. Accordingly, if the first sharing option 426 is selected, at step 408, the selected POI/destination is displayed on the community display 34 for access/use. Further, the community display 34 may then add the POI/destination as a marker 428 on a travel route 430, and subsequently display a notification 432 that the particular user has added a new POI/destination to the travel route 430.

A second sharing option 434 shares the POI/destination to the driver's screen (e.g., a personal device or center stack display 36), a third sharing option 436 shares the POI/destination to a screen of Passenger #1, and a fourth sharing option 438 shares the POI/destination to a screen of Passenger #2. At step 410, selecting any of sharing options 434, 436, and 438 will then display a POI/destination share notification 440 on the selected person's screen 442.

At step 412, the POI/destination share notification 440 provides the targeted recipient the option of a "Save" soft button 444 and a "Dismiss" soft button 446. Further, if the recipient is the driver, the POI/destination share notification 440 further provides a "NAV Now" soft button 448. Selecting the "Save" soft button 444 saves the POI/destination to the particular device or community application on that particular device. Selecting the "Dismiss" soft button 446 will close or remove the POI/destination notification 440 on the screen 442. Selecting the "NAV Now" soft button 448 will navigate the travel route to the shared POI/destination.

In other examples, the community application enables a passenger (e.g., $3_{rd}$ row passenger) to use community platform 300 to talk with another passenger in the vehicle (e.g., the driver), for example using personal audio zones and a live video feed between the passengers and their personal devices. In still other implementations, profile avatars 302 (FIG. 19) may be displayed on display 60 or peripheral device 80 and subsequently selecting profile avatar 302 provides options for interacting with that individual (e.g., media share, call, join, invite, or mute).

Figure 22:
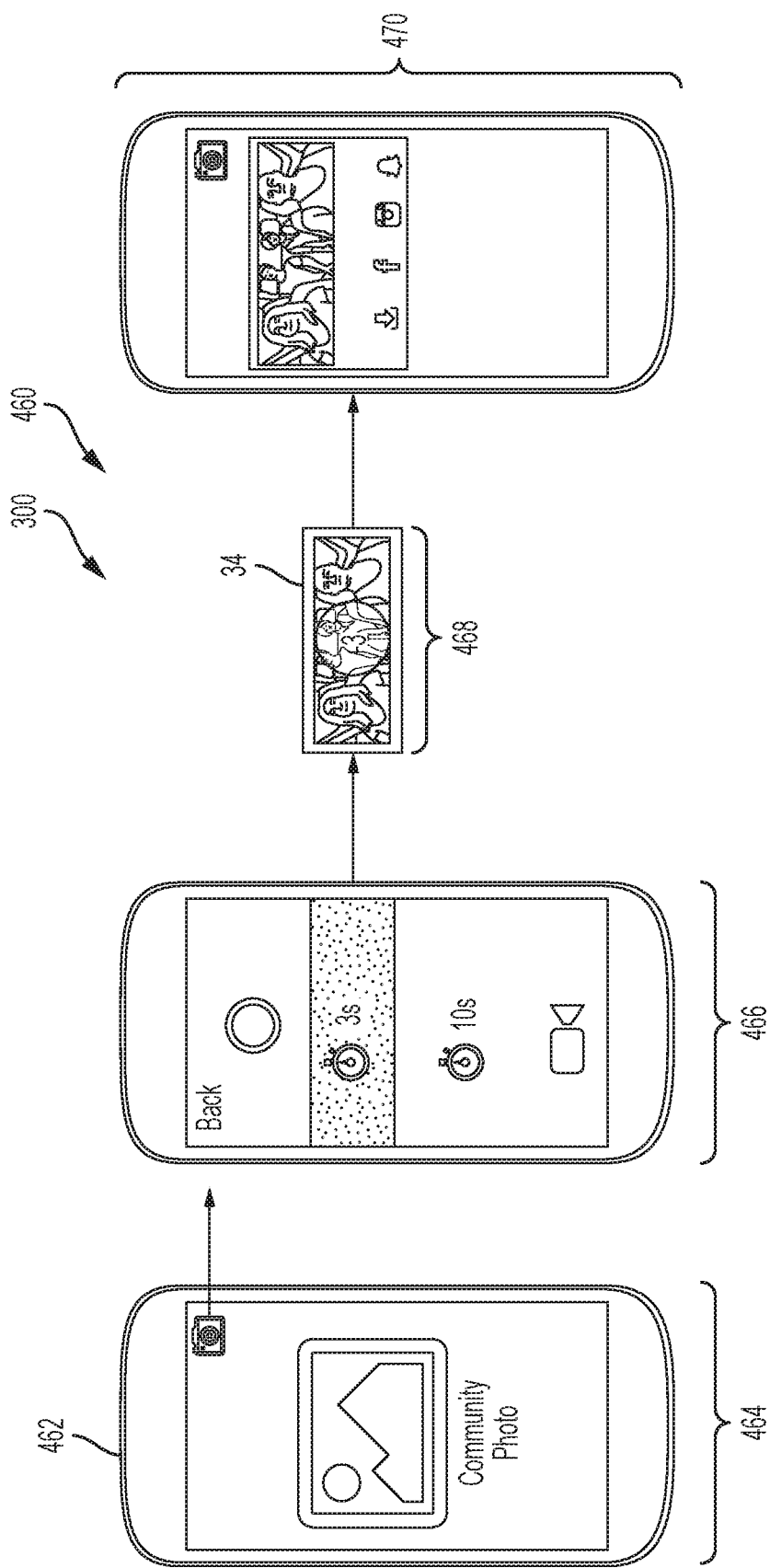
FIG. 22 is a schematic flow diagram illustrating another example control method for the community platform, in accordance with the principles of the present disclosure.

FIG. 22 illustrates another example implementation 460 of community sharing on the vehicle community platform 300 via the community application. It will be appreciated that the illustrated layout and design are merely exemplary and the community platform 300 and community application can have any suitable arrangement that enables community platform 300 and community application to function as described herein. In the illustrated example, a passenger can initiate an in-vehicle photo on a personal device 462 or other device in the vehicle. The personal device 462 and/or community display 34 can display a notification that a photo has been initiated (step 464), display a countdown to taking the photo (step 466), and then display the taken photo (step 468). At step 470 media content is shared by pressing a share icon (not shown), pressing or holding the media content, and then dragging over to the person or display you want to share the media with.

With continued reference to FIGS. 1, 3, and 23, the community platform 300 is additionally configured to interact with a vehicle lighting system 500. In the example embodiment, vehicle lighting system 500 generally includes an exterior lighting system 502 and an interior lighting system 504.

With reference to FIG. 1, the exterior lighting system 502 will be described in more detail. As illustrated, vehicle front end 14 includes front customizable lighting 510, vehicle rear end 16 includes rear customizable lighting 520, and vehicle sides 18 include a customizable door ring lighting 530 extending generally about an outer perimeter of each door assembly 20. The front customizable lighting 510, the rear customizable lighting 520, and the customizable door ring lighting 530 are configured to display a particular color based on various conditions.

For example, exterior lighting system 502 displays a predetermined color based on a profile of the driver or passenger(s), whether the vehicle is operating in an autonomous driving mode, or when the vehicle is being utilized for-hire (e.g., taxi-cab). The predetermined color can be determined based on vehicle programming, user preference, and/or one or more user profiles associated with the community platform 300. For example, a first driver of vehicle 10 may select red as the chosen color associated with his/her profile. Upon the vehicle 10 detecting the first driver is approaching or is in the vehicle, the exterior lighting system 502 can display the color red. However, a second driver of vehicle 10 may select yellow as the chosen color associated with his/her profile. Upon the vehicle 10 detecting the second driver is approaching or is in the vehicle, the exterior lighting system 502 can display the color yellow. However, the predetermined color is not limited to the driver, and may be chosen based on various other conditions such as a passenger profile or a location of the vehicle.

Moreover, as shown in FIG. 1, exterior lighting system 502 may include one or more light projectors 540 located on the vehicle such as on the front 14, rear 16, or sides 18 of the vehicle. The light projectors 540 can be configured to project information onto the ground for the vehicle driver, passenger(s), and/or persons within proximity to vehicle 10 (e.g., pedestrians). For example, light projectors 540 may display greeting messages/displays/animations on the ground about the vehicle 10 when a person authorized to access the vehicle approaches the vehicle. For example, the vehicle 10 can detect the person (e.g., the driver) based on facial recognition, voice recognition, device sync (e.g., Bluetooth), etc. and subsequently displays a greeting message/display/animation 542 (FIG. 1) on the ground to the driver.

Similarly, light projectors 540 may display exit messages/displays/animations on the ground around the vehicle 10 when a person authorized to access the vehicle exits the vehicle. For example, the vehicle 10 can detect the person exiting the vehicle (e.g., when the vehicle is in park and the doors 20 open) and subsequently displays an exit message/display/animation on the ground to the person. However, light projectors 540 may display messages/displays/animations at any ground location around the vehicle 10 or even on objects (e.g., walls) in proximity to the vehicle.

In other scenarios, light projectors 540 may display warning messages/symbols on the ground or surrounding area, as shown in FIG. 1. For example, vehicle 10 includes sensors and/or cameras that monitor the area around the vehicle 10, and the light projectors 540 can be utilized to display warnings or directions to persons in or around the vehicle. In one example, the vehicle sensors and/or cameras can detect another vehicle approaching vehicle 10 and project a warning onto the ground to alert the driver/passengers not to exit the vehicle until the traffic has cleared. Similarly, the warnings/directions may be utilized to provide a countdown to when it is safe to leave the vehicle and/or cross the street. In other scenarios, light projectors 540 may display a message reminding drivers/passengers about an object left in the vehicle (e.g., in the trunk). In another scenario, light projectors 540 are utilized to denote an area on the ground for persons to stand in order to be able to utilize a vehicle camera (not shown) to take a photo of one or more persons. Accordingly, light projectors 540 are operably connected to the vehicle systems and are utilized to communicate useful information about the safety and status of vehicle 10, as well as for the safety of persons in proximity to vehicle 10.

With further reference to FIGS. 3, 12, and 24, interior lighting system 504 will be described in more detail. The interior lighting system 504 includes a customizable seat lighting system 560 (FIG. 3), a customizable dome lighting system 570 (FIG. 12), a customizable headliner lighting system 580 (FIG. 3), and a customizable floor lighting system 590 (FIG. 24). Interior lighting system 504 is configured to display a predetermined color based on the profile of the driver or passenger(s), whether the vehicle is operating in an autonomous driving mode, and/or when the vehicle is being utilized for-hire (e.g., taxi-cab).

The predetermined color can be determined based vehicle programming, user preference, and/or based on a user profile associated with the vehicle. For example, each vehicle seat 28 may include one customizable seat lighting system 560. Based on the profile of the person sitting in that particular seat 28, the seat lighting system 560 will display the predetermined color in an aura beneath the seat.

For example, a first person sitting in the driver seat 28a may have a color profile set to red, and the seat lighting system 560 will display red when the first person sits in the seat 28a. However, a second person sitting in the front passenger seat 28b may have a color profile set to yellow, and the seat lighting system 560 will display yellow when the second person sits in the seat 28b. Similarly, the customizable dome lighting system 570 may include an overhead dome light 168 (see FIG. 13) coupled to the vehicle roof/headliner 38 that is configured to display a predetermined color based on a passenger profile or a vehicle condition.

Similarly, as shown in FIG. 3, the customizable headliner lighting system 580 may include a continuous or non-continuous light 582 circumscribing a portion or all of the vehicle roof/headliner 38 that is configured to display a predetermined color based on a passenger profile and/or a vehicle condition. As shown in FIG. 24, the customizable floor lighting system 590 includes a continuous or non-continuous light 592 circumscribing a portion or all of the vehicle floor 48. The light 592 is configured to display a predetermined color based on a passenger profile and/or a vehicle condition.

Described herein is a vehicle with upgradeable modular technology that enables the vehicle to evolve as technology advances. It provides the user with the ability to create a vehicle with the features they desire and to easily upgrade those features. Moreover, personal devices are seamlessly integrated with the vehicle. In addition, a community platform creates a social space for passengers to enhance in-vehicle communication. Passengers are able to share media, POIs, photos, and other data from personal devices to a community display. Passengers can create a group media playlist, engage in group trip planning, take group photos, etc. Moreover, the community platform can enable the creation of a group or community profile where an intelligent engine can provide media, POI, and travel suggestions based on each passenger's common interests.

Further, users are able to customize interior and exterior lighting, and the vehicle can detect the surrounding environment with sensors/cameras and communicate with persons in proximity to the vehicle. Additionally, a user can create a profile that is a visual display of personal data associated with that specific user. The user is able to save their preferences in the system or cloud so they can easily access their data/profile across multiple vehicles. Facial recognition and voice biometrics eliminate the need for a key as the vehicle automatically recognizes and configures for the user. As authorized users approach the vehicle, they are recognized and matched to their profile. If there is a match, the vehicle illuminates based on the detection of the user, and the user can open and close the doors/hatches via voice commands with an associated light sequence.

It will be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle comprising:
    at least one display;
    a central controller in signal communication with the at least one display and configured to detect a plurality of unique user profiles associated with peripheral electronic user devices located within the vehicle, the central controller configured to establish signal communication with the peripheral electronic user devices located within the vehicle, and load each unique user profile and provide a visual display of each user profile on the at least one display; and
    at least one customizable lighting system in signal communication with the central controller, wherein the central controller is configured to adjust one or more lighting characteristics of the at least one customizable lighting system;
    wherein the at least one customizable lighting system is an interior vehicle lighting that includes a seat lighting system with a seat light disposed on one or more seats of the vehicle, each seat light configured to selectively provide a color aura around the associated seat.

2. The vehicle of claim 1, wherein the at least one customizable lighting system further includes a floor lighting system circumscribing at least a portion of an outer perimeter of a floor of the vehicle.

3. The vehicle of claim 1, wherein the at least one customizable lighting system further includes a dome light coupled to a roof of the vehicle.

4. The vehicle of claim 1,
    wherein the central controller is configured to define a community profile based on the detected unique user profiles, and
    wherein the central controller is configured to provide contextual suggestions for the community profile based on determined common interests and/or preferences of the unique user profiles.

5. The vehicle of claim 4, wherein the contextual suggestions include music, destinations, and food choices.

6. The vehicle of claim 1, wherein the central controller includes a community platform that connects the peripheral electronic user devices for interaction (i) between the peripheral electronic user devices and (ii) between the peripheral electronic user devices and the at least one display.

7. The vehicle of claim 6, wherein said interaction includes sharing music.

8. The vehicle of claim 6, wherein said interaction includes sharing video.

9. The vehicle of claim 6, wherein said interaction includes sharing media.

10. The vehicle of claim 6, wherein said interaction includes sharing destinations.

11. The vehicle of claim 6, wherein said interaction includes sharing points of interest.

12. The vehicle of claim 6, wherein the community platform is configured to:
    display on the peripheral electronic user devices media that can be shared on the community platform; and
    provide a share soft button on the peripheral electronic user devices to share the media with one or more other peripheral electronic user devices.

13. The vehicle of claim 12, wherein the community platform is further configured to:
    provide a selection menu soft button on the peripheral electronic user devices after a user selects the share soft button, the selection menu providing a list of (i) the at least one display and (ii) one or more other peripheral electronic user devices that the media can be shared with.

14. The vehicle of claim 1, wherein the central controller is configured to display a different image identifying each detected unique user profile.

15. The vehicle of claim 14, wherein the different image includes a unique color for each unique user profile.

16. The vehicle of claim 14, wherein the central controller is configured to visually identify input corresponding to each unique user profile such that the at least one display visually displays input corresponding to each unique user profile in a different manner.

17. The vehicle of claim 16, wherein the central controller is configured to visually identify the input corresponding to each unique user profile using a different color.

18. The vehicle of claim 1, wherein the at least one customizable lighting system further includes an exterior vehicle lighting.

19. The vehicle of claim 18, wherein the exterior vehicle lighting includes lighting located on a front of the vehicle.

20. The vehicle of claim 18, wherein the exterior vehicle lighting includes lighting located on a rear of the vehicle.

21. The vehicle of claim 18, wherein the exterior vehicle lighting includes ring lighting disposed about doors of the vehicle.

22. The vehicle of claim 18, wherein the exterior vehicle lighting includes a projector configured to project a light onto areas surrounding the vehicle.

23. The vehicle of claim 22, wherein the projected light comprises a greeting message, an exit message, or a warning message.

24. A vehicle comprising:
- at least one display;
- a central controller in signal communication with the at least one display and configured to detect a plurality of unique user profiles associated with peripheral electronic user devices located within the vehicle, the central controller configured to establish signal communication with the peripheral electronic user devices located within the vehicle, and load each unique user profile and provide a visual display of each user profile on the at least one display; and
- at least one customizable lighting system in signal communication with the central controller, wherein the central controller is configured to adjust one or more lighting characteristics of the at least one customizable lighting system;
- wherein the at least one customizable lighting system is an interior vehicle lighting that includes a headliner lighting system circumscribing at least a portion of an outer perimeter of a headliner of the vehicle.

25. A vehicle comprising:
- at least one display;
- a central controller in signal communication with the at least one display and configured to detect a plurality of unique user profiles associated with peripheral electronic user devices located within the vehicle, the central controller configured to establish signal communication with the peripheral electronic user devices located within the vehicle, and load each unique user profile and provide a visual display of each user profile on the at least one display; and
- at least one customizable lighting system in signal communication with the central controller, wherein the central controller is configured to adjust one or more lighting characteristics of the at least one customizable lighting system;
- wherein the at least one customizable lighting system is an interior vehicle lighting that includes a foot well lighting system configured to provide lighting customized to one of the unique user profiles associated with a seat adjacent the foot well area,
- wherein the central controller is configured to control the foot well lighting system to provide lighting differently customized for multiple unique user profiles corresponding to users in multiple different seats.

26. A vehicle comprising:
- at least one display;
- a central controller in signal communication with the at least one display and configured to detect a plurality of unique user profiles associated with peripheral electronic user devices located within the vehicle;
- the central controller configured to establish signal communication with the peripheral electronic user devices located within the vehicle, load each unique user profile and provide a visual display of each user profile on the at least one display, wherein the central controller includes a community platform that connects the peripheral electronic user devices for interaction (i) between the peripheral electronic user devices and (ii) between the electronic user devices and the at least one display;
- wherein said interaction includes sharing at least one of media, destinations, and points of interest;
- wherein the community platform is configured to:
  - display on the peripheral electronic user devices at least one of the media, destinations, and points of interest that can be shared on the community platform;
  - provide a share soft button on the peripheral electronic user devices to share at least one of the media, destinations, and points of interest with one or more other peripheral electronic user devices; and
  - provide a selection menu soft button on the peripheral electronic user devices after a user selects the share soft button, the selection menu providing a list of (i) the at least one display and (ii) one or more other peripheral electronic user devices that the at least one of media, destinations, and points of interest can be shared with;
- wherein the central controller is configured to define a community profile based on the detected unique user profiles, and provide contextual suggestions for the community profile based on determined common interests and/or preferences of the unique user profiles; and
- a customizable lighting system in signal communication with the central controller, wherein the central controller is configured to adjust one or more lighting characteristics of the at least one customizable lighting system based on a preference associated with one of the unique user profiles, wherein the customizable lighting system includes:
  - lighting located on the front of the vehicle, a rear of the vehicle, ring lighting disposed about doors of the vehicle, and a projector configured to project a light onto areas surrounding the vehicle; and
  - a dome light coupled to the roof of the vehicle, a seat lighting system with a seat light disposed on one or more seats of the vehicle, and a headliner lighting system circumscribing at least a portion of an outer perimeter of a headliner of the vehicle;
- wherein the central controller is configured to control the customizable lighting system to provide lighting differently customized for multiple unique user profiles corresponding to users in multiple different seats.

* * * * *